US012622844B2

(12) United States Patent
Yannopoulos et al.

(10) Patent No.: US 12,622,844 B2
(45) Date of Patent: May 12, 2026

(54) CLOSED-LOOP SYSTEM FOR CARDIOPULMONARY RESUSCITATION (CPR)

(71) Applicants: Regents of the University of Minnesota, Minneapolis, MN (US); Georgia Tech Research Corporation, Atlanta, GA (US)

(72) Inventors: Demetris Yannopoulos, Minneapolis, MN (US); Evangelos Theodorou, Atlanta, GA (US); Manan Gandhi, Atlanta, GA (US);

(Continued)

(73) Assignees: Regents of the University of Minnesota, Minneapolis, MN (US); Georgia Tech Research Corporation, Atlanta, GA (US)

( * ) Notice: Subject to any disclaimer, the term of this patent is extended or adjusted under 35 U.S.C. 154(b) by 1104 days.

(21) Appl. No.: 17/250,418

(22) PCT Filed: Jul. 19, 2019

(86) PCT No.: PCT/US2019/042634

§ 371 (c)(1),
(2) Date: Jan. 19, 2021

(87) PCT Pub. No.: WO2020/018923

PCT Pub. Date: Jan. 23, 2020

(65) Prior Publication Data

US 2021/0275391 A1 Sep. 9, 2021

Related U.S. Application Data

(60) Provisional application No. 62/701,289, filed on Jul. 20, 2018.

(51) Int. Cl.
*A61H 31/00* (2006.01)

(52) U.S. Cl.
CPC ...................... *A61H 31/006* (2013.01); *A61H 2201/1246* (2013.01); *A61H 2201/1619* (2013.01);

(Continued)

(58) Field of Classification Search
CPC .... A61H 31/006; A61H 31/005; A61H 31/00; A61H 31/008; A61H 31/004;

(Continued)

(56) References Cited

U.S. PATENT DOCUMENTS

| | | | | |
|---|---|---|---|---|
| 5,772,613 | A | 6/1998 | Gelfand | |
| 2013/0296719 | A1* | 11/2013 | Packer | G16H 80/00 600/484 |

(Continued)

FOREIGN PATENT DOCUMENTS

| | | | | |
|---|---|---|---|---|
| WO | 2009/156924 | A1 | 12/2009 | |
| WO | WO-2010004499 | A1 * | 1/2010 | A61H 31/004 |
| WO | WO-2017131477 | A1 * | 8/2017 | A61B 5/00 |

OTHER PUBLICATIONS

English Machine Translation of WO-2017131477-A1 provided by Espacenet (Year: 2017).*

(Continued)

*Primary Examiner* — Joseph D. Boecker
*Assistant Examiner* — Brian T Khong
(74) *Attorney, Agent, or Firm* — Shumaker & Sieffert, P.A.

(57) ABSTRACT

Systems, devices, and techniques for controlling a compression unit associated with cardiopulmonary resuscitation (CPR) are described herein. For example, a medical system may include a compression unit configured to apply pressure to a torso region of a patient. The compression unit may be configured to move within space according to at least one (Continued)

degree of freedom. The medical system may further include processing circuitry configured to receive one or more sets of data representative of one or more patient parameters of the patient. Additionally, the medical system may generate, using a deep learning model, an output data set representing a predicted trajectory of at least one patient parameter of the one or more patient parameters, determine a set of control parameters, and control the compression unit to apply the pressure to the torso region of the patient.

20 Claims, 18 Drawing Sheets

(72) Inventors: Matthew Olson, Minneapolis, MN (US); Pierre Sebastian, Minneapolis, MN (US); Yunpeng Pan, Atlanta, GA (US)

(52) U.S. Cl.
CPC ................ *A61H 2201/1664* (2013.01); *A61H 2201/5007* (2013.01); *A61H 2201/5048* (2013.01); *A61H 2201/5071* (2013.01); *A61H 2201/5097* (2013.01); *A61H 2203/0456* (2013.01); *A61H 2205/084* (2013.01); *A61H 2230/045* (2013.01); *A61H 2230/255* (2013.01)

(58) Field of Classification Search
CPC ........ A61H 2031/001; A61H 2031/002; A61H 2031/003; A61N 1/39044; G06N 20/00; G06N 20/10
See application file for complete search history.

(56) References Cited

U.S. PATENT DOCUMENTS

2015/0352367 A1 12/2015 Quan et al.
2016/0125161 A1* 5/2016 Sankaran ................ A61M 1/00 703/11
2016/0213560 A1 7/2016 Sturdivant
2016/0296762 A1 10/2016 Ramachandran et al.
2016/0317385 A1* 11/2016 Salcido ................ A61H 31/006
2017/0312165 A1* 11/2017 Johnson ................. A61B 5/021
2018/0110667 A1 4/2018 Freeman et al.
2018/0364657 A1* 12/2018 Luo ...................... G05D 1/0221
2019/0274919 A1 9/2019 Lee

OTHER PUBLICATIONS

Sebastian et al., “Closed-loop machine-controlled CPR system optimises haemodynamics during prolonged CPR,” Elsevier, Science Direct, Resuscitation Plus 3, Jul. 28, 2020, 9 pp.

Gandhi et al., “Learning to Predict Coronary Perfusion Pressure During Cardiopulmonary Resuscitation,” Proceedings of the ASME 2018 Dynamic Systems and Control Conference, DSCC 2018, Atlanta, USA, Sep. 30-Oct. 3, 2018, 10 pp.

International Search Report and Written Opinion of International Application No. PCT/US2019/042634, mailed Oct. 7, 2019, 7 pp.

Yannopoulos et al., “Coronary Artery Disease in Patients With Out-of-Hospital Refractory Ventricular Fibrillation Cardiac Arrest,” Elsevier, The American Cardiology Foundation, Journal of the American College of Cardiology, vol. 70, No. 9, Jun. 22, 2017, pp. 1109-1117.

International Preliminary Report on Patentability from International Application No. PCT/US2019/042634, mailed Feb. 4, 2021, 6 pp.

* cited by examiner

CLOSED-LOOP SYSTEM FOR CARDIOPULMONARY RESUSCITATION (CPR)

This application is a National Stage application under 35 U.S.C. § 371 of PCT Application No. PCT/US2019/042634, entitled "CLOSED-LOOP SYSTEM FOR CARDIOPULMONARY RESUSCITATION (CPR)" and filed on Jul. 19, 2019, which claims the benefit of U.S. Provisional Patent Application No. 62/701,289, titled "CLOSED-LOOP SYSTEM FOR CARDIOPULMONARY RESUSCITATION (CPR)" and filed Jul. 20, 2018. The entire contents of application nos. PCT/US2019/042634 and 62/701,289 are incorporated herein by reference.

TECHNICAL FIELD

The disclosure relates to systems and techniques for delivery of cardiopulmonary resuscitation (CPR).

BACKGROUND

Cardiopulmonary resuscitation (CPR) is an emergency procedure for treating, among other things, serious heart conditions (e.g., heart failure). CPR may include chest compressions and artificial respiration intended to induce circulation in a patient's body and deliver oxygen to the patient's organs such as the brain. Chest compressions and rescue breaths may be delivered at a predetermined frequency. In some cases, a human actor (e.g., bystander, paramedic, clinician, or the like) may perform CPR on a patient experiencing cardiac arrest.

SUMMARY

Systems, devices, and techniques are described for controlling cardiopulmonary resuscitation (CPR) on a patient using a medical device. In some examples, the medical device (e.g., a compression unit) may deliver CPR based on one or more sets of data generated by one or more physiological sensors, the one or more sets of data being representative of physiological signals (e.g., physiological parameters) sensed from the patient. Additionally, or alternatively, the medical device may deliver CPR based on a historical database including physiological data from a plurality of test subjects. In this manner, the medical device may deliver CPR in a closed-loop system (e.g. CPR is administered to bring the one or more sets of data to a target state).

In some examples, a medical system may use a deep learning model to represent the internal cardiovascular function of the patient, and apply an a controller to control the medical device, such as the compression unit, to provide CPR to the patient based on one or more sets of data generated from sensed physiological signals of the patient, and a plurality of test subjects. The system may apply the one or more sets of data to a deep learning model that outputs a data set that represents a predicted trajectory of a patient parameter, such as coronary perfusion pressure or other parameter indicative of patient physiology. In one example, the deep learning model in combination with a controller may map the one or more sets of data to a set of control parameters, where the set of control parameters defines operation of the medical device to perform CPR on the patient. The set of control parameters may cause the medical device to move within one or more available degrees of freedom. For example, the compression unit may be configured to move horizontally within a three-dimensional space, and the compression unit may additionally be configured to rotate within the three-dimensional space about an axis or a reference point. In some examples, the medical device may define a single degree of freedom (e.g., the compression unit is configured to move along one axis). In other examples, the medical device may have five degrees of freedom (e.g., the compression unit may move horizontally parallel to) three axes and rotate about two axes.

Additionally, or alternatively, the medical system may implement a heuristic operation in order to determine the set of control parameters for causing the medical device to move within the one or more available degrees of freedom. For example, the medical system may include one or more sensors configured to generate one or more sets of data being representative of physiological signals. In turn, the medical system may output the one or more sets of data, or some subset thereof, for display via a user interface. Subsequently, the medical system may receive, via the user interface, input representative of a user selection of a one or more values for respective control parameters of a set of control parameters. The one or more values of the set of control parameters may at least partially control the medical device to move within one or more available degrees of freedom such that the medical device performs CPR on a patient. In this manner, the user selection associated with the set of control parameters may fully, or partially with input from the system, control the medical device to perform CPR.

In one example, a medical system includes a compression unit configured to apply pressure to a torso region of a patient, the compression unit configured to move according to at least one degree of freedom. The medical system further includes processing circuitry configured to receive, from one or more physiological sensors configured to generate one or more sets of data representative of one or more patient parameters of a patient, the one or more sets of data; generate, using a deep learning model, an output data set representing a predicted trajectory of at least one patient parameter of the one or more patient parameters; determine, based on the output data set, a set of one or more control parameters; and control, based on the set of one or more control parameters, the compression unit to apply the pressure to the torso region of the patient.

In another example, a method includes receiving, by processing circuitry and from one or more physiological sensors configured to generate one or more sets of data representative of one or more patient parameters of a patient, the one or more sets of data; generating, by the processing circuitry and using a deep learning model, an output data set representing a predicted trajectory of at least one patient parameter of the one or more patient parameters; determining, by the processing circuitry and based on the output data set, a set of one or more control parameters; and controlling, by the processing circuitry and based on the set of one or more control parameters, a compression unit to apply pressure to a torso region of the patient, the compression unit configured to move according to at least one degree of freedom.

In another example, a system includes a memory including a deep learning model; and processing circuitry configured to: receive, from one or more physiological sensors configured to generate one or more sets of data representative of one or more patient parameters of a patient, one or more sets of data; generate, using the deep learning model, an output data set representing a predicted trajectory of at least one patient parameter of the one or more patient parameters; determine, based on the output data set, a set of one or more control parameters; and control, based on the set of one or more control parameters, a compression unit to apply pressure to a torso region of the patient, the compression unit configured to move according to at least one degree of freedom.

In another example, a method includes receiving a set of baseline data, the set of baseline data representing data measured from a plurality of historical test patients. The method further includes training a plurality of parameters that at least partially define a deep learning model and receiving one or more sets of data representative of one or more patient parameters of a patient. The one or more sets of data are generated by one or more physiological sensors associated with the patient. The method further includes updating, based on the one or more sets of data, one or more parameters of the plurality of parameters that at least partially defines the deep learning model; determining, using the deep learning model and based on the one or more sets of data, a plurality of output data sets, the plurality of output data sets representing predicted trajectories of at least one patient parameter of the plurality of patient parameters. The method further includes determining, based on the plurality of output data sets, a set of one or more control parameters that at least partially defines operation of a compression unit configured to apply pressure to a torso region of the patient by moving according to at least one degree of freedom; and outputting the set of one or more control parameters.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
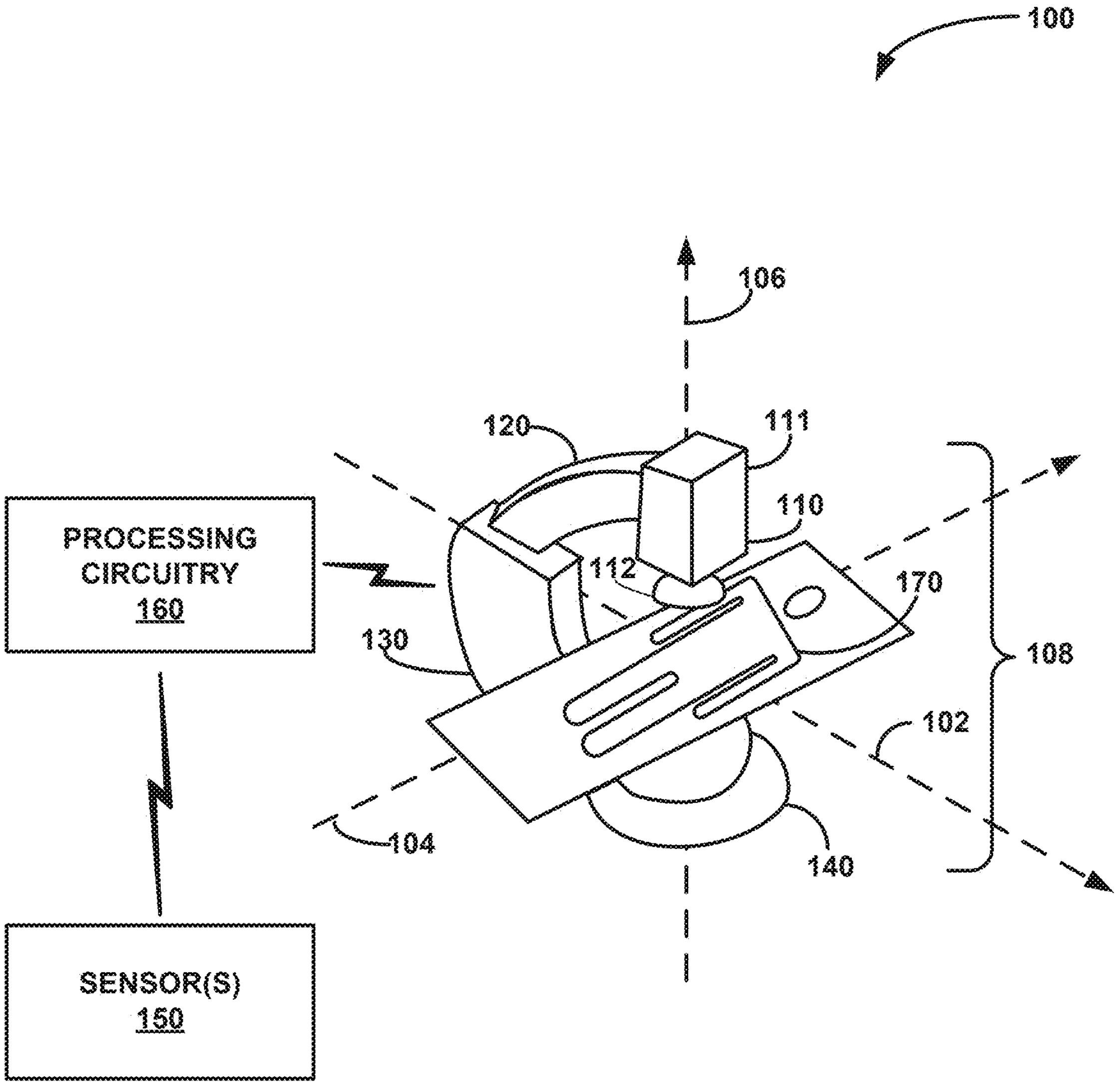
FIG. 1 is a conceptual diagram illustrating an example system for monitoring and treating conditions using cardiopulmonary resuscitation (CPR), in accordance with one or more techniques of this disclosure.

The disclosure describes examples of medical devices, systems, and techniques for controlling a medical device to perform cardiopulmonary resuscitation (CPR) on a patient based on one or more sets of acquired patient data. During scenarios in which a patient's breathing or heartbeat has ceased, CPR is a potentially life-saving treatment. If cardiac arrest occurs in a patient outside a medical facility, the patient has a highest chance of survival if CPR is administered by a bystander immediately. After emergency medical personnel arrive, CPR may be continued by the medical personnel, or may be continued using an automated CPR device, such as embodiments of the medical device of this disclosure. CPR may be continued after the patient reaches a medical facility and may be further continued while the patient undergoes surgery.

The American Heart Association (AHA) recommends that untrained bystanders administer CPR by compressing the patient's chest at a rate of 100-120 compressions per minute. Trained individuals, e.g., lifeguards, clinicians, paramedics, or the like, are advised by the AHA to include rescue breaths while administering CPR. Since untrained bystanders and trained individuals alike are unable to gauge certain parameters such as an exact amount of force applied to the patient, human-administered CPR may be inefficient for adjusting on a patient-by-patient basis. For example, a large adult may require more forceful chest compressions to induce adequate blood flow than is necessary for a small child. Thus, a bystander may be unable to accurately determine a precise amount of force to apply. A CPR delivery machine may be an automated device that applies compressions to a patient to standardize CPR according to AHA guidelines; however, these CPR machines do not adjust CPR delivery according to patient-specific data, or are ineffective at adjusting compressions to the specific needs of the patient. In addition, no CPR delivery machine to date is able to automatically adjust its position in 3D space with multiple degrees of freedom.

In some examples, as described herein, a medical system may be configured to: measure one or more sets of patient-specific data; update a deep learning model based on incoming measurements; and determine a set of one or more control parameters that at least partially defines operation of a medical device, such as a compression unit, for providing compressions to a torso of a patient based on patient-specific data. In one example, the medical system may use the incoming measurements to update the parameters of a deep learning model. The deep learning model will then be used to predict the trajectory of physiological parameters of the patient by varying the control parameters. The next step could be to compute a performance metric, also known as a cost value, for each control parameter set and corresponding physiological trajectory. Finally, the medical system can choose a set of control parameters based on the cost values of each predicted trajectory of physiological parameters.

Additionally, or alternatively, a medical system may be configured to measure one or more sets of patient-specific data and output the one or more sets of patient-specific data via a user interface, enabling a user to view and/or perceive the one or more sets of patient-specific data. Subsequently, the medical system may receive input representative of a user selection of one or more values of respective control parameters of a set of control parameters, where a medical device of the medical system is configured to administer CPR based on the set of control parameters. In this way, the user selection of the values for the set of control parameters may be selected by the user based on the one or more sets of patient-specific data in order to control the medical device to administer CPR. Such a system may thus operate under full control of the user or partial control from the user with additional control provided by the automated system (i.e., partially automated).

The compression unit of the medical device may be configured to operate within one or more degrees of freedom, the compression unit applying pressure pulses to a torso region of the patient. The medical device may be configured for use within a medical facility (e.g., ambulance, clinic, hospital, or the like). In other examples, the medical device may be portable and used in the field, and/or in a facility, to provide chest compressions and/or breaths to the patient as needed. The compression unit may be configured to apply pressure to the torso of the patient in examples where a set of control parameters is determined based on cost values associated with the deep learning model. Additionally, the compression unit may be configured to apply pressure to the torso of the patient in examples where a set of control parameters is determined based on the user selection.

One patient parameter used to control the medical device may be coronary perfusion pressure (CPP). CPP is the pressure difference between the diastolic aortic pressure and the left ventricular end diastolic pressure. CPP is often used as a metric for blood flow in the coronary arteries. During cardiac arrest, CPP may be an important parameter in determining whether a patient will experience return of spontaneous circulation (ROSC) (e.g., a higher CPP value may give the patient a greater chance of experiencing ROSC). Thus, it may be desirable to control a compression unit to increase CPP while administering CPR to provide the patient an increased probability of survival. The devices and techniques of this disclosure may include measuring one or more sets of physiological data from a patient, including CPP, and controlling a medical device to deliver CPR to the patient based on the one or more sets of physiological data. In some examples, a deep learning model may be used to map control parameters of the medical device to predicted trajectories of physiological data. This model can be used in conjunction with a controller to output control parameters. Additionally, in some examples, a set of control parameters of the medical device may be determined based on a user selection. CPR delivered by one or more example medical devices of this disclosure may increase the patient's probability of survival over CPR delivered according to AHA guidelines, since the medical device is configured to measure patient-specific data and map the patient-specific data to control parameters governing movements of the medical device.

FIG. 1 is a conceptual diagram illustrating an example system 100 for monitoring and treating conditions using CPR, in accordance with one or more techniques of this disclosure. As illustrated in the example of FIG. 1, system 100 may be a medical system that includes medical device 108, sensor(s) 150, processing circuitry 160, and patient 170. Medical device 108 includes compression unit 110, inner arm 120, outer arm 130, and base unit 140. Processing circuitry 160 may be contained within a computing device and may communicate with medical device 108 and/or sensors 150 via wired and/or wireless communication. In some examples, medical device 108 may include processing circuitry 160 and/or other components such as a memory device, communication circuitry, and/or other circuitry.

Medical device 108 may be configured to treat one or more medical conditions of patient 170 by performing CPR, the medical conditions including but not limited to cardiac arrest and/or agonal breathing. Medical device 108 may be configured for use in the field and/or medical facilities (e.g., ambulances, clinics, hospitals, or the like), and medical device 108 may be configured to be operated by clinicians, healthcare professionals, or bystanders in some examples. In some examples, medical device 108 may continue CPR on a patient after CPR is performed by a bystander shortly after the patient becomes unresponsive due to cardiac arrest. Medical device 108 may continue administering CPR prior to, during, and after surgery.

Figure 2:
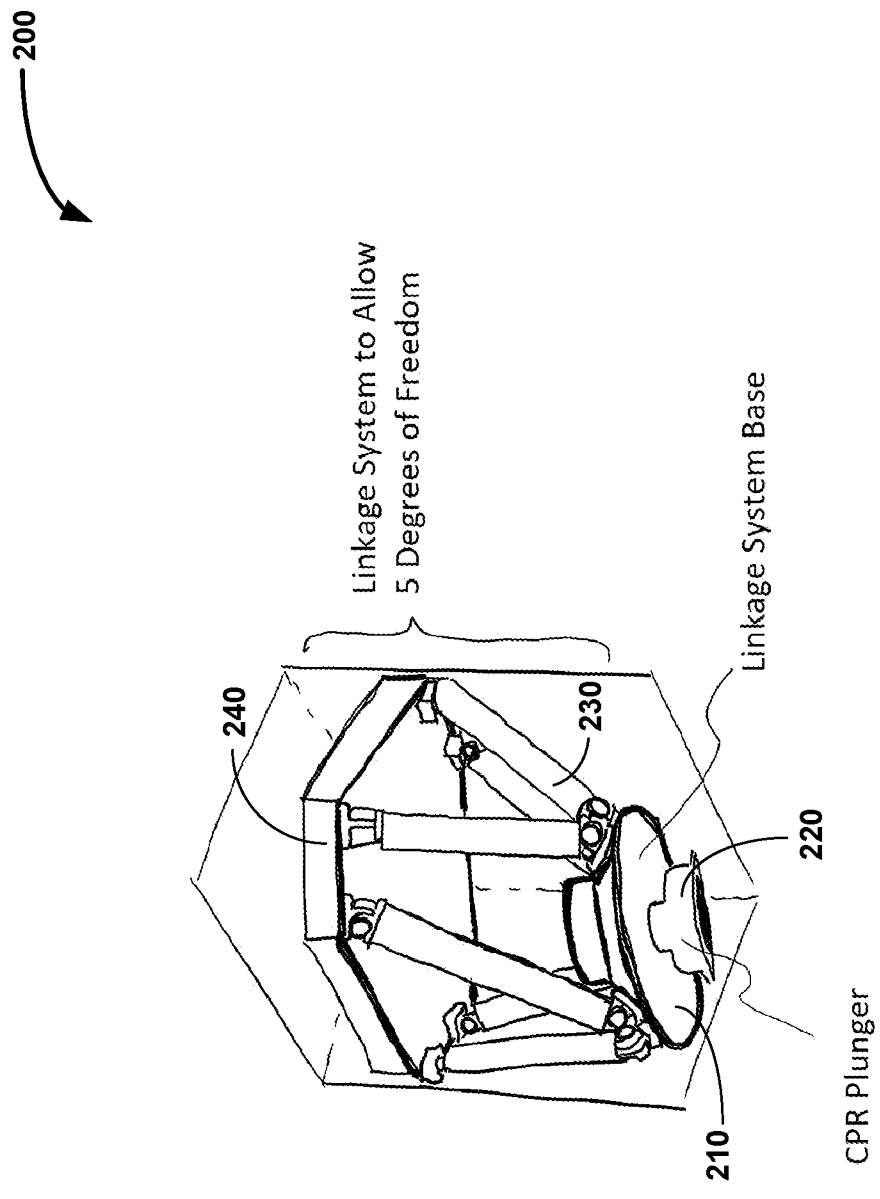
FIG. 2 is a conceptual diagram of a linkage system within a CPR Piston for enabling five degrees of freedom of the medical device of FIG. 1, in accordance with one or more techniques of this disclosure.

Compression unit 110 may be configured to apply pressure to a surface (e.g., a torso region) of patient 170. In the example of FIG. 1. Compression unit 110 may extend along a longitudinal axis from proximal end 111 to distal end 112. Although depicted as a static component in FIG. 1, compression unit 110 may be configured to move within a three-dimensional space defined by x-axis 102, y-axis 104, and z-axis 106. In the example illustrated in FIG. 1, x-axis 102 is perpendicular to y-axis 104. Additionally, z-axis 106 is orthogonal to both x-axis 102 and y-axis 104. A linkage design which makes further movement of the compression unit in 3D space attainable is illustrated by FIG. 2. The design illustrated allows rotation about the aforementioned axes in addition to linear movement along the axes. In one example, compression unit 110 may apply a first pressure by moving distally along the longitudinal axis towards the torso region of patient 170. Additionally, compression unit 110 may apply a second pressure (e.g., reduce the first pressure and/or provide a negative pressure) by moving proximally along the longitudinal axis away from the torso region of patient 170. This may be referred to as active decompression in some examples. In some examples, the first pressure comprises "pushing" on the torso region, and the second pressure comprises "pulling" on the torso region. In one example, compression unit 110 may apply the first pressure and the second pressure in a series of pulses, the series of pulses representing a sinusoidal oscillation. In other words, compression unit 110 may oscillate between moving proximally along the longitudinal axis and moving distally along the longitudinal axis at a predetermined frequency. As discussed in further detail below, processing circuitry 160 may control compression unit 110 to oscillate according to control parameters, such as but not limited to an oscillation frequency of the compression unit, an oscillation amplitude of compression unit 110, a duty cycle of the compression unit 110, a maximum applied pressure of compression unit 110, or one or more position parameters corresponding to the at least one degree of freedom. The one or more position parameters may include at least one of a linear velocity of compression unit 110, an angular velocity of compression unit 110, a linear acceleration of compression unit 110, and an angular acceleration of compression unit 110.

In other examples, compression unit 110 may be configured to provide non-sinusoidal oscillations, such as oscillations that may include ramp functions, square waves, or a combination of multiple waveforms for the displacement, speed, and/or accelerations of the movement of the piston of compression unit 110.

In the example illustrated in FIG. 1, the longitudinal axis of compression unit 110 is aligned with z-axis 106. In one example, compression unit 110 may move according to one degree of freedom-proximally and distally along z-axis 106. Alternatively, in other examples, compression unit 110 may move according to more than one degree of freedom, allowing the longitudinal axis to be horizontally displaced from z-axis 106 and allowing the longitudinal axis to rotate such that it forms an oblique angle with z-axis 106 according to one or more techniques described herein.

In the example provided by FIG. 1, the inner arm 120 may include a circular segment having a proximal end and a distal end, the proximal end of inner arm 120 connected to compression unit 110. The interface between inner arm 120 and compression unit 110 may enable compression unit 110 to move horizontally relative to inner arm 120. The longitudinal axis of compression unit 110 may remain parallel with z-axis 106, however the longitudinal axis may horizontally displace from z-axis 106. While these lateral displacements of compression unit 110 occur within linear degrees of freedom, compression unit 110 may also be configured for angular displacements, as discussed in further detail below.

Outer arm 130 may be a semi-circular segment defining a lumen configured to receive at least a portion of inner arm 120. Inner arm 120 may slidably move relative to inner arm 130 (e.g., inner arm 120 may retract within the lumen of outer arm 130, and inner arm 120 may extend out of the lumen of outer arm 130). In some examples, movement of inner arm 120 relative to outer arm 130 may cause the longitudinal axis of compression unit 110 to form an oblique angle with z-axis 106. In some examples, these movements may rotate compression unit 110 about y-axis 104. In other examples, movement of inner arm 120 relative to outer arm 130 may rotate compression unit 110 about an axis parallel to y-axis 104. Movement of inner arm 120 relative to outer arm 130 may enable compression unit 110 to move within a first rotational degree of freedom. After rotating within the first rotational degree of freedom, compression unit 110 may be configured to oscillate along its longitudinal axis and apply the first pressure and the second pressure to the torso region of patient 170 at an angle. In other examples, an inner arm 120, and an outer arm 130, may be replaced by inner and outer linkage systems, or other geometrically-shaped frames.

Base unit 140 may rest on a floor, a table, or another surface configured to support medical device 108. A distal end of outer arm 130 may be connected to base unit 140. The connection between outer arm 130 and base unit 140 may be configured to allow outer arm 130, inner arm 120, and compression unit 110 to pivot about an axis parallel to x-axis 102, thus creating an oblique angle between the longitudinal axis of compression unit 110 and z-axis 106. Additionally, or alternatively, compression unit 110 may rotate at its connection with inner arm 120, causing compression unit 110 to rotate about an axis parallel to x-axis 102. The rotation of compression unit 110 about an axis parallel to x-axis 102 enables compression unit 101 to move within a second rotational degree of freedom. In other examples, medical device 108 may be configured as a wearable device or otherwise provide compression unit in an alternative structure. As mentioned, the compression unit 110 may be configured to contain a higher degree of freedom joint apparatus as shown in FIG. 2. This linkage system would allow for translation in the x and y plane, while simultaneously allowing for vectoring of the compression force.

Sensor(s) 150 may include one or more physiological sensors configured to measure one or more physiological signals of patient 170 and generate sets of data respective of the measured one or more physiological signals (e.g., patient parameters). Sensor(s) 150 may include at least one of pressure sensors (e.g., piezoelectric pressure sensors), intraosseous pressure sensors, flow meter sensors, impedance mapping sensors, intrathoracic pressure sensors, electrocardiogram (ECG) electrodes, and capnography sensors. Sensors 150 may be implantable or external to the patient. In one example, pressure sensors are implanted inside the cardiovascular system of patient 170, the pressure sensors measuring CPP of patient 170. A plurality of ECG electrodes may be attached to patient 170 providing a plurality of ECG vectors. In some cases, processing circuitry 160 may determine a location of a heart of patient 170 by analyzing the plurality of ECG vectors. Capnography sensors may be configured to measure a concentration or partial pressure of carbon dioxide ($CO_2$) gas, or any other gas respired by patient 170. Additionally, or alternatively, sensor(s) 150 may include other physiological sensors configured to measure other sets of physiological data (e.g., aortic pressure, end tidal $CO_2$, tissue pH, tissue oxygen saturation, or the like) of patient 170.

In some examples, sensor(s) 150 may include image capture devices, such as x-ray devices, magnetic resonance imaging (MRI) devices, computed tomography (CT) scan devices, infrared imaging, ultrasound imaging, impedance mapping, or the like. Data from the image capture devices may be used by processor 160 to determine control parameters governing medical device 108. Sensors 150 may transmit data to processing circuitry 160 via wired and/or wireless communication.

Processing circuitry 160 may include any one or more of a microprocessor, a controller, a digital signal processor (DSP), an application specific integrated circuit (ASIC), a field-programmable gate array (FPGA), one or multiple graphics processing units (GPU's), or equivalent discrete or analog logic circuitry. In some examples, processing circuitry 160 may include multiple components, such as any combination of one or more microprocessors, one or more controllers, one or more DSPs, one or more ASICs, or one or more FPGAs, as well as other discrete or integrated logic circuitry. The functions attributed to processing circuitry 160 herein may be embodied as software, firmware, hardware or any combination thereof.

Although FIG. 1 illustrates processing circuitry 160 apart from medical device 108, in some examples, processing circuitry 160 may be housed in medical device 108. In other examples, processing circuitry 160 may be housed in other components (not pictured in FIG. 1.), and processing circuitry 160 may connect with medical device 108 via wireless communication using any techniques known in the art. Examples of communication techniques may include, for example, low frequency or radiofrequency (RF) telemetry, or according to the Bluetooth® or Bluetooth LE specifications.

Processing circuitry 160 may train a deep learning model based on sets of historical data, wherein the sets of historical data include physiological data measured from a plurality of historical test patients. In training the deep learning model, processing circuitry may set a plurality of parameters that at least partially define the deep learning model. In one example, the deep learning model may include a plurality of nodes arranged in one or more layers, and the plurality of parameters may include weight values for respective connections between the plurality of nodes. Although the plurality of parameters is initially set by processing circuitry 160, the plurality of parameters may be changed. The deep learning model may be represented by recursive linear regression algorithms, sparse spectrum gaussian processes, feedforward neural networks (FFNNs), recurrent neural networks (RNNs), or the like, which are discussed in further detail below. A memory device in communication with processing circuitry 160 may store the deep learning model.

Processing circuitry 160 may also implement an algorithm from optimal control theory to use the predictions generated by the deep learning model. A control algorithm may include a process where candidate control parameters are iteratively improved based on a cost value that represents performance of candidate control parameters. The control algorithm can be specified to increase a given performance metric, such as maintenance of a value of CPP.

In some examples, processing circuitry 160 may receive one or more sets of data representing one or more physiological signals of a patient. The one or more sets of data may be measured by sensor(s) 150. Sensor(s) 150 may measure the one or more sets of data and deliver the one or more sets of data to processing circuitry 160 in real time. Based on the one or more sets of data, processing circuitry 160 may iteratively update one or more parameters of the plurality of parameters of the deep learning model (e.g., processing circuitry 160 may "re-train" the deep learning model based on the one or more sets of data gathered in real time). After processing circuitry 160 re-trains the deep learning model, processing circuitry 160 may use the deep learning model to map the one or more sets of candidate control parameters to an output data set. The output data set may represent a predicted trajectory of a patient parameter, such as CPP. Since CPP often may be increased to increase a patient's probability of survival, analysis of the output data set may drive the determination of how to control medical device 108 to deliver CPR.

In response to obtaining the output data set representing the predicted trajectory of the patient parameter, processing circuitry 160 may determine which control parameters increase a quality of CPR administered by medical device 108. The set of control parameters may define movements of medical device 108, thus determining aspects of therapy provided by medical device 108 to patient 170. In determining the set of control parameters, processing circuitry 160 may perform a plurality of simulations. For example, processing circuitry 160 may assemble a plurality of sets of candidate control parameters based on the output data set representing the predicted trajectory of the patient parameter. Processing circuitry 160 may then iteratively update the plurality of sets of candidate control parameters based on incoming measurements and generated predictions in order to increase quality of CPR delivered by medical device 108.

In one example, about 10,000 sets of candidate control parameters may be assembled by processing circuitry 160. However, in other examples, more than about 10,000 or less than about 10,000 sets of candidate control parameters may be assembled by processing circuitry 160. Processing circuitry 160 may calculate a cost value for each set of output data generated by the candidate control parameters and the deep learning model. The cost values may be calculated by a cost function. The cost value is a scalar value that quantifies potential performance of the specified candidate control parameter. The set of candidate control parameters having the lowest cost value may be used to compute control updates to control medical device 108 to perform CPR on patient 170. Processing circuitry 160 may be configured to determine the set of control parameters in real time, updating the control parameters as the deep learning model accumulates and processes data.

Control parameters may include parameters governing movements of medical device 108, such as an oscillation frequency of compression unit 110, an oscillation amplitude of compression unit 110, a maximum applied pressure of compression unit 110, duty cycle of compression unit 110, and or more position parameters corresponding to the one or more degrees of freedom. For example, control parameters may control movements of compression unit 110 within the three linear degrees of freedom, the first rotational degree of freedom, and the second rotational degree of freedom. Control parameters may include a desired position of compression unit 110 within the three-dimensional space. Additionally, control parameters may include a desired acceleration or velocity of compression unit 110 within the three-dimensional space. In some examples, a pressure sensor of sensor(s) 150 may be located within compression unit 110, and the pressure sensor may measure pressure applied to the torso region of patient 170. Medical device 150 may determine a location on z-axis 106 where the pressure applied to the torso region reaches a threshold value, and processing circuitry 160 may use the determined location as a control parameter defining a maximum extension of compression unit 110 on z-axis 106. These maximum or threshold values may prevent compression unit 110 from "pushing" too hard on the patient 170 and prevent compression unit 110 from causing trauma to the patient 170 (e.g. broken ribs, pneumothorax, hemothorax, lacerations to major organs, or other forms of trauma).

In some examples, medical device 108 may further include a positive pressure ventilator (not pictured in FIG. 1) configured to supply respiratory pressure to patient 170. The positive pressure ventilator may perform "rescue breaths" during the application of CPR. In some examples, the positive pressure ventilator may apply pressure to the respiratory system of patient 107 based on one or more sets of physiological data recorded by sensor(s) 150. The deep learning model may thus guide selection of control parameters driving the operation of the positive pressure ventilator in addition to, or alternative from, the compression unit 110. In this manner, the deep learning model may incorporate ventilation into prediction of values for the patient.

FIG. 2 is a conceptual diagram of a linkage system 200 within the CPR Piston for enabling five degrees of freedom of medical device 108 of FIG. 1, in accordance with one or more techniques of this disclosure. Linkage system 200 may include linkage system base 210, plunger 220, arms 230, and linkage system platform 240. Arms 230 may be actuated to orient plunger 220 such that plunger 220 may move within at least one degree of freedom. In some examples, movement of arms 230 may enable plunger 220 to move in three linear degrees of freedom and two rotational degrees of freedom. In some examples, linkage system 200 may be included in compression unit 110 of FIG. 1. In some examples, linkage system platform 240 may be stationary.

Example techniques of this disclosure may describe delivering automated, mechanical CPR by predicting CPP within 5 mmHg at a given moment in time. As described with respect to the experimental data provided herein, deep learning methods may be utilized in order to model the CPP of a patient subjected to automated chest compressions. During preprocessing of the data, sampling rate, delays and moving average filtering may improve predictions. A variety of algorithms may be used, and a performance of each algorithm may be analyzed for single-step and long-term predictions. The results indicate that a delayed linear system achieves this target for single step predictions, such as within 0.25 mmHg. For longer time horizons, other, perhaps complex, models may provide more accurate predictions. Computationally intensive models such as the long-short-term memory network (LSTM) and the sparse spectrum gaussian process (SSGP) may be better suited for long term prediction accuracy. In some examples, the LSTM may provide better single run performance, while the SSGP may provide overall better average performance.

This disclosure presents the application of various deep learning algorithms for the task of predicting CPP. Several techniques are described for modeling the dynamics of the heart during cardiac arrest as well as dynamics during CPR. Previous work has focused on parameterizing the dynamics using linear basis function models, or focused purely on the dynamics of the chest cavity as opposed to the heart itself. Methods of this disclosure may directly predict a surrogate for blood flow in the heart, a common metric known as CPP. Providing accurate predictions of CPP many seconds into the future may be useful in certain medical applications, including active CPR control.

In the instance that a patient experiences a cardiac arrest, a primary goal of CPR is to induce flow throughout the heart, maintaining bodily function until help arrives. Consequently, quality of CPR and the flow it generates to the heart are critical to survival following cardiac arrest. When CPR does not generate enough flow to the heart itself, the heart becomes ischemic, leading to heart failure and an inability of patients to be defibrillated back to a steady rhythm. Furthermore, blood flow to the heart is represented hemodynamically by a physiological parameter called the CPP. Thus, adequately predicting CPP during CPR is a clinically-relevant application of deep learning. In some examples, deep learning may be applied to a physiological model with the goal of predicting CPP.

Figure 3:
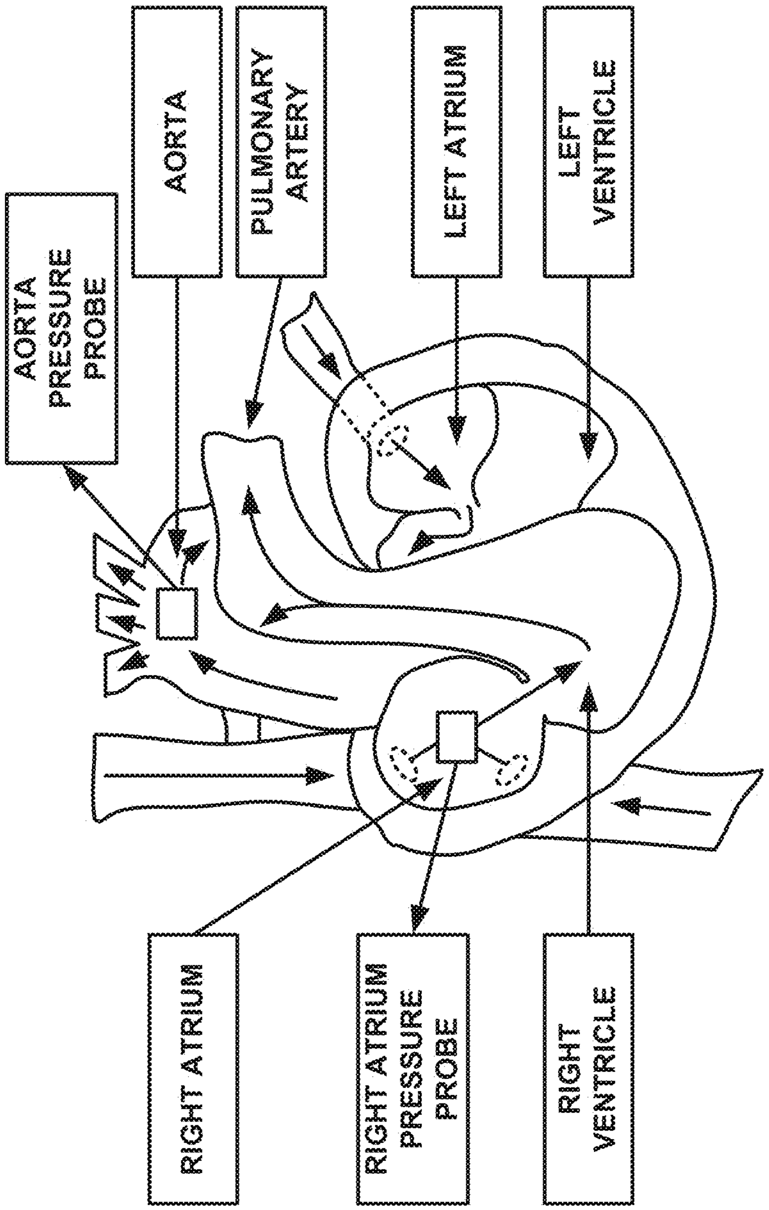
FIG. 3 is a block diagram illustrating a heart with example sensor locations, in accordance with one or more techniques of this disclosure.

Techniques of this disclosure may be applied to both porcine and human patients. For each set of experimental data generated, an adult female pig may be sedated, intubated, anesthetized, and instrumented with piezoelectric pressure sensors which monitored aortic blood pressure (Ao) and right atrial (RA) blood pressure (FIG. 3). Once instrumented, cardiac arrest may be electrically induced. During cardiac arrest, the heart no longer pumped in a concerted motion. Thus, pressure may be equalized between the 4 chambers of the heart. After equalizing pressure, the driving force behind flow to the heart's vessels may be quantified as the raw difference between the Right Atrial Pressure (RA) and the Aortic Pressure (Ao) (i.e., CPP). After 5 minutes of untreated cardiac arrest, RA and Ao may be continuously measured as cardiopulmonary resuscitation is administered via an active compression-decompression CPR device. The mechanical CPR device may operate over a range of distances to compress and decompress the chest of the pig. In some examples, no drugs or therapeutic agents are given to the pig over the course of CPR so as to monitor and predict a scenario where basic life support is given to a patient following their arrest. An aggregate (n=75) of all data gathered via this model may be utilized throughout the deep learning process.

In this disclosure, a state space approach may be taken to model the hemodynamics of the heart. A state vector may be defined as $x \in \mathbb{R}^{Ns}$, a control vector may be defined as $u \in \mathbb{R}^{Nc}$ and an output vector may be defined as $y \in \mathbb{R}^{No}$. A parameter k may represent a given timestep, and $\delta t$ may represent a time interval in discrete dynamics. The state space approach may include an unknown true model F and some unknown observation function from the system state to the outputs H:

$$x_{k+1} = F(x_k, u_k, \ldots, x_{k-n}, u_{k-n}, t_k) \tag{1}$$

$$y_{k+1} = H(x_{k+1}) \tag{2}$$

Due to the biological nature of the true model, it may be difficult to impose a structure upon the system. The order of the dynamics, dependence on delayed system states and controls, as well as time variation are all unknowns that cannot be explicitly specified a priori. As a result of these difficulties, this disclosure utilizes techniques from deep learning in order to develop a model that can approximate F. CPP may be denoted as $w \in \mathbb{R}$. Since CPP is the driving force behind blood flow to the heart, the first element of the state $x_1$ may equal w. The following model may be constructed:

$$x_{k+1} = \hat{F}(x_k, u_k, \ldots, x_{k-n}, u_{k-n}, t_k) + \varepsilon \tag{3}$$

$$w_{k+1} = e_1^T x_{k+1} \tag{4}$$

where $\varepsilon$ represents model error, and $e_1$ is the first elementary unit vector so that CPP can be extracted from the predicted system state. In some examples, delays may be represented explicitly with previous states, and the system state may be fully observable.

Each of the regressors may use different inputs and outputs in relation to the true dynamics model shown in Equation (1) and the true observation model Equation (2). As such, for each regressor a vector input z may be defined and an output of each model may be defined as s. The distinction between states x, controls u, model inputs z, and model outputs s may illustrate how the choice of model features and targets can vary from a given state space representation.

Linear Regression: Recursive Least Squares Regression may represent the true model F with a linear surrogate. The input to the regressor may be given by $$z_k = [x_k^T, u_k^T, \ldots, x_{k-n}^T, u_{k-n}^T]^T \in \mathbb{R}^{N_x} \quad (5)$$

Since there are delays in the system, previous system states and controls may be explicitly appended into the input to capture dependencies. The index n may be the number of previous timesteps to append to the input. In some examples, the output to the regressor is the prediction for the next state or set of states:

$$s_{k+1} = [\hat{x}_{k+1}^T, \ldots, \hat{x}_{k+m}^T]^T \in \mathbb{R}^{N_s} \quad (6)$$

The notation $\hat{x}_k$ may represent predicted states, which vary from the true state by the previously defined error ε in Equation (3). The index m may be a desired number of timesteps forward that may be predicted. For n>m, the system is a delayed dynamical system. For n=m, the system technically has no delays, just an augmented state. The desired CPP predictions may be recovered by extracting the appropriate values from each element of s.

For recursive least squares regression, the prediction and update equations are the following. K and $P_k$ are the Kalman gain and the precision matrix of the recursive least squares update law.

$$s_{k+1} = W_k z_k \quad (7)$$

$$K = \frac{\lambda^{-1} P_k z_k}{(1 + \lambda^{-1} z_k^T P_k z_k)} \quad (8)$$

$$W_{k+1} = W_k + K(x_k - \hat{x}_k)^T \quad (9)$$

$$P_{k+1} = \lambda^{-1}(P_k - K x_k^T P_k) \quad (10)$$

Gaussian Processes and Sparse Spectrum Gaussian Processes: Gaussian Process Regression (GPR) are techniques for representing probability distributions over functions. Compared to parametric representations such as neural networks, the non-parametric GPs are more robust to overfitting. A GP is formally defined as a collection of random variables, any finite number of which has a joint Gaussian distribution. Analogous to a Gaussian distribution over a random variable, a GP over a random function is specified by a mean function and a covariance function. In this work, a prior GP(0, K($z_i$, $z_j$)) is used where $$K(z_i, z_j) = \sigma_s^2 \exp\left(-\frac{1}{2}(z_i - z_j)^T L^{-1}(z_i - z_j)\right) + \sigma_n^2 \quad (11)$$

However, this disclosure does not preclude the use of other priors including but not limited to Matern, linear, polynomial, periodic, exponential, or any combination of priors; stationary or non-stationary.

The variables L, $\sigma_s$, and $\sigma_n$ are lengthscales, signal variance, and measurement variance respectively. They are usually called hyperparameters. Given a set of observed data (Z, S) where Z and S are vectors of training inputs and outputs, respectively, and an input point z*, GP regression may be performed by conditioning the joint Gaussian distribution between the observed outputs and prediction p(s*, S) on S, Z and z*, i.e., p(s*|S, Z, z*), which is also a Gaussian distribution. The hyperparameters can be optimized by maximizing the marginal likelihood p(S|Z).

However, despite the mathematical convenience, this computation scales poorly with large number of training datasets. In order to apply this technique to large datasets, Sparse Spectrum Gaussian Process (SSGP) Regression may be used. A key idea of SSGP is that the kernel function can be approximated by finite number of Fourier basis functions without bias, i.e. evaluate the expectation K($z_i$, $z_j$)=E[$\Phi_\omega$($z_i$), $\Phi_\omega$($z_j$)*] where $$\Phi_\omega = [\varphi_{\omega_1}(z), \ldots, \varphi_{\omega_r}(z)], \varphi_{\omega_i}(z) = \frac{\sigma_s}{\sqrt{r}}\begin{pmatrix}\cos(\omega_i^T z)\\ \sin(\omega_i^T z)\end{pmatrix}, \quad (12)$$

i=1, . . . , r, and w can be sampled from a distribution q whose density function is an inverse Fourier transformation of K($z_i$,$z_j$). The posterior distribution can be computed as follows $$s^* \mid z^*, Z, S \sim \mathcal{N}(W^T \phi_\omega(z^*), \sigma_n^2(1 + \phi_\omega^T A^{-1} \phi\omega)) \quad (13)$$

$$A = \Phi_\omega \Phi_\omega^T + \sigma_n^2 \sum\nolimits_p^{-1} \quad (14)$$

$$W = A^{-1} \Phi_m S. \quad (15)$$

Given a new input-output data pair ($z_{k+1}$; $s_{k+1}$), an incremental update can be performed. First the weight W may be decomposed into A and $$b = \Phi_\omega^T,$$

and the incremental update can be performed as follows $$A_{k+1} = \lambda A_k + (1 - \lambda)\phi(z_{k+1})\phi(z_{k+1})^T \quad (16)$$

$$b_{k+1} = \lambda b_k + (1 - \lambda)\phi(z_{k+1}) s_{k+1} \quad (17)$$

Additionally, in some examples, methods of data efficient, sparse, and/or computationally tractable kernel representations including but not limited to the Fully-Independent-Training-Conditional (FITC), Induced-Point GP's, and Sparse GP's may be used to perform approximate inference, create the generative model, and provide data efficiency.

For incremental updates, the key is to update the inverse of A. Computing the inverse directly scales cubically with the number of random features. The Cholesky factor of A may be updated and a rank-1 update may be performed. The computational complexity can be reduced to quadratic in the number of random features.

Feed Forward Neural Networks: A feedforward neural network (FFNN), also known as multi-layer perceptron is a composition of multiple parametric functions. Each sub-function is a layer of the network. The output of each of the layers are called features except the last layer. These features are created by training algorithms. Mathematically, an N layer feed forward neural network may be written as:

$$h_i = f(W_i h_{i-1} + b),\ i = 1, \ldots, N \tag{18}$$

$$\bar{s}(z) = W_{out} h_N \tag{19}$$

where $h_0=z_k$, the term b is a bias term in each layer, $W_i$ are the layer weights, and the nonlinear activation function representing $f$ may be the rectified-linear unit (ReLu), i.e., $f(x)=\max(0,x)$. The output layer is linear as shown above. In order to learn all the parameters, a performance criterion may be defined as the squared error of prediction plus a regularization term:

$$J = \frac{1}{N}\sum_{i=1}^{N}(s_i - s(\bar{z}_i))^2 + \lambda\|W\|^2 \tag{20}$$

where W is the concatenation of $W_1, \ldots, W_{out}$. Next, the parameters can be optimized via stochastic gradient descent, e.g., update a parameter iteratively on a small batch of training data $w \leftarrow w - \alpha\nabla_w J$. Three hidden layers of 300 neurons each may be used, and a learning rate $\alpha=0.01$ may be applied. Alternative activation functions, loss functions, network structures and optimization algorithms may, in some cases, be substituted in place of this to aid performance.

Echo State Networks: The echo state network is a reservoir computing approach utilized to predict sequences of outputs. In some examples, the internal weights, the input weights, and feedback weights are randomly generated, and the output weights are linearly trained. Properties of the internal weights such as the spectral radius and sparsity play a role in test efficiency and numerical stability of the algorithm. In this case, the hidden state $h_k$ may be an abstract representation of the state space of the system being modeled. The input to the Echo State Neural Network now only consists of the control input $u_k$. The output of the network at a given timestep is the predicted target $s_{k+1}$.

$$h_{k+1} = \tanh(Wh_k + W_{in}u_{k+1} + W_{fb}x_k + v \tag{21}$$

$$s_{k+1} = W_{out}\left[h_{k+1}^T, u_{k+1}^T\right]^T \tag{22}$$

In some examples, ν is Gaussian noise injected into the hidden state computation for numerical stability. A reservoir size of 100 units may be utilized.

Recurrent Neural Networks: The long-short-term memory (LSTM) network is a recurrent neural network utilizing an internal cell with a specific structure as defined in Equations (23)-(27). A key feature of LSTMs and other gated recurrent models may be the mitigation of vanishing and exploding gradient problem via internal loops where data can accumulate and be forgotten. LSTM units may be applied with the following structure, where $h_k$ is the hidden layer vector, xx is the input vector, bi are biases and $W_i$ are weight matrices. In one example, equations (23), (24), (25), (26) represent the forget gate, cell update, external input gate, and output gate respectively.

$$f_k = \sigma(W_f[h_{k-1}, x_k] + b_f) \tag{23}$$

$$s_k = f_k s_{k-1} + g_k\sigma(b_s + W_s[h_{k-1}, x_k]) \tag{24}$$

$$g_k = \sigma(b_o + W_o[h_{k-1}, x_k]) \tag{25}$$

$$h_k = \tanh(s_k)q_k \tag{26}$$

$$q_k = \sigma(b_o + W_o[h_{k-1}, x_k]) \tag{27}$$

A fully connected layer may be appended with linear activation for a read-out layer of the LSTM output. An LSTM with 50 units and a single readout layer may be utilized to predict the target $s_k$.

In one example, a first mode of prediction may be performed in this disclosure, the first mode representing a single-step prediction without incremental updating. This mode ignores the fact that a time-series is being predicted and purely focuses on predicting the next set of system states given the input. In another example, incremental single-step predictions are implemented, which allows the model parameters to update given the error between prediction and the ground truth. In another example, multi-step prediction is implemented, which propagates the model forward given the previous prediction and a sequence of controls.

An example state space representation with the CPR model is described herein. The sensors utilized in each in-vivo experiment are illustrated, and the choice of metrics are justified. The subsampling rate of the raw data may be analyzed, explicitly incorporating delay into the state space representation, performing filtering over the raw data, as well as plotting correlation in time between data points. Recursive Least Squares Regression may be used as a baseline regressor when determining an appropriate set of state variables, control variables, subsampling rate, time history dependence, and filtering.

Example Algorithm 1 Single Step Algorithm

```
Fit regressor with training data.
Initialize regressor state with first state input x0.
while K<test length do
Get current input zk from current ground truth state xx
  and control uk.
Predict next state sk+1 given input zk.
if Incremental Update then
Update regressor with predictive error.
end if
end while
```

Example Algorithm 2 Multi Step Algorithm

```
Fit regressor with training data.
Initialize regressor state with first state input x0=z0.
```

3: while K<test length do
4: Predict next state $s_{k+1}$ given input $z_k$.
5. Get current state from previous prediction $\hat{x}_k$
6: Get current input $z_k$ from $\hat{x}_k$ and given control $u_k$.
7: end while FIG. 3 is a drawing of the heart. In this example, two piezoelectric sensors may be placed at the right atrium and the aorta respectively, and while compressing the chest cavity, a specialized device may be compressed to distances generated by a sinusoid-like waveform. The device may be configured to measure the force required for such compressions. The following measurements may be utilized as potential state variables: CPP (mmHg), Ao (mmHg), and Force (N). In one example, the control variable in all cases is Distance (cm). For each algorithm, certain stationarity assumptions (such as a zero mean target) may be beneficial. This may be achieved through normalization of the inputs by their mean and variance, or by differencing the targets to predict CPP increments as opposed to raw CPP.

Figure 4:
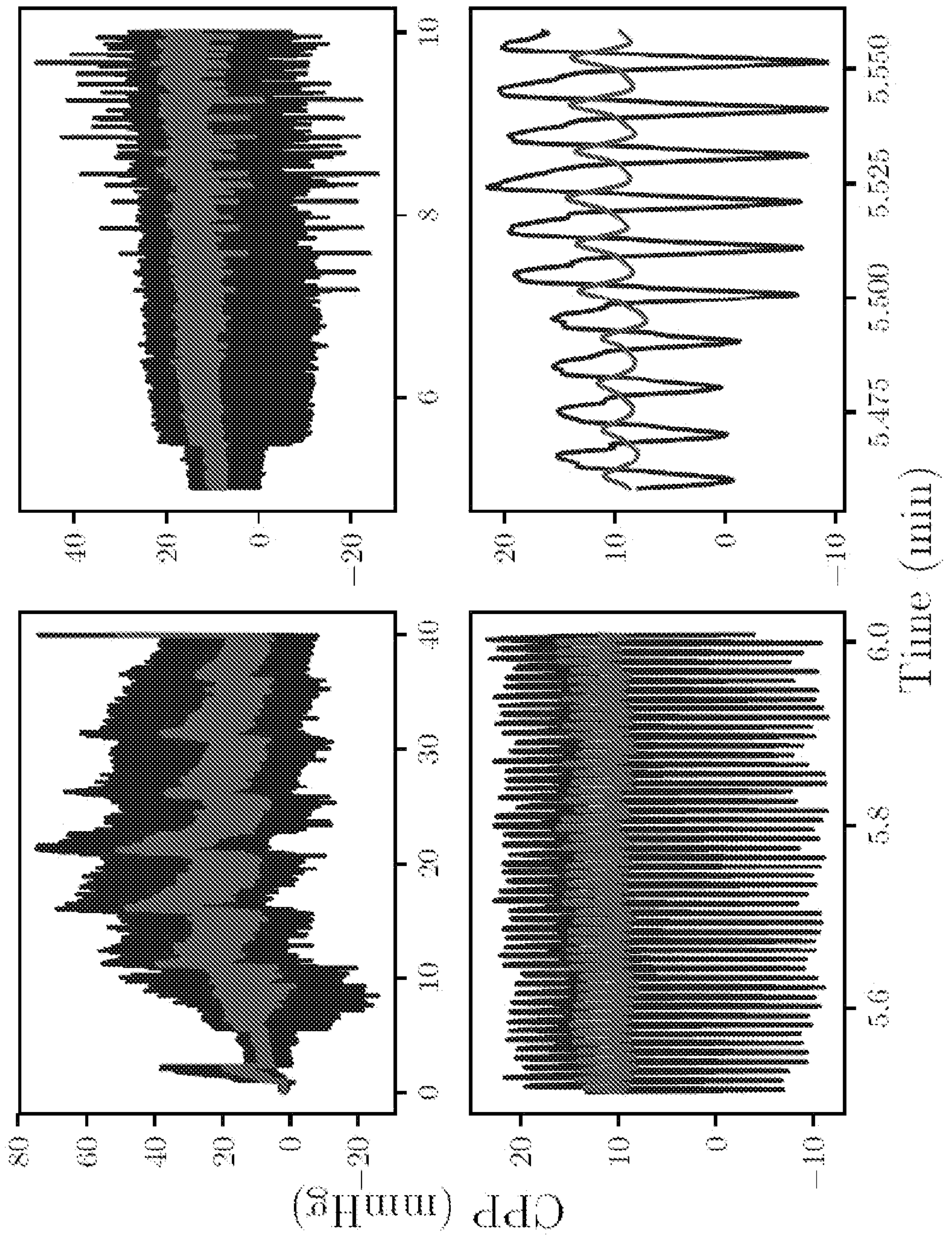
FIG. 4 is a series of graphs illustrating example running average coronary perfusion pressure (CPP) versus raw CPP, in accordance with one or more techniques of this disclosure.

Piezoelectric pressure transducers may be utilized to measure pressure in the right atrium and in the aorta. Noise in the measurements may emerge from electronic interference as well as the sensor colliding with the interior walls of the heart. During the collection of CPP measurements, outlier values may be removed (values that are too high or low and likely are caused by collision). While the input compression frequency may be around 100 beats per minute, CPP dependence may be captured over the course of minutes. With respect to time-delays in the system, these delays are considered on the order of time steps, which are milliseconds apart. While there are deep learning techniques to deal with long term and short term time dependence (LSTM Networks for example), this phenomena by may be captured by appending the system state with a running average of the CPP. FIG. 4 demonstrates this effect for a given patient. The blue waveform represents the raw CPP, and the red waveform represents the running average over a 0.5 second window. The small timescale oscillations are clearly smoothed out in the bottom right figure, and over the course of 40 minutes, the long term trend is depicted in the top left window.

For regression, the effectiveness of appending the filter CPP values to the state can be demonstrated. Table 1 demonstrates for various sampling rates and delay sizes how appending the filtered CPP (Filt column) improves the Root Mean Squared Error (RMSE). Note that delay sizes are given in timesteps. The RMSE may be utilized as a metric, and the RMSE of CPP may be computed, as this is the state that is of most importance monitoring a patient during cardiac arrest. In some examples, excluding the open-loop multi step prediction, adding the filtered CPP to the state results in an improved estimate. The difference is even more pronounced when the delay is explicitly included into the input of the regression. The delay sizes may be chosen to use the previous second of data in order to predict the next timestep.

TABLE 1

Effects of Filtered State on Linear Regression RMSE (mmHg) over 10 Folds

| Rate | Delay | SS | | ISS | | WMS | |
|---|---|---|---|---|---|---|---|
| (Hz) | Size | Filt | Raw | Filt | Raw | Filt | Raw |
| 10 | 10 | 4.1 | 8.6 | 3.8 | 8.3 | 3.4 | 6.5 |
| 10 | 1 | 14.1 | 15.3 | 13.0 | 13.0 | 10.6 | 11.8 |

TABLE 1-continued

Effects of Filtered State on Linear Regression RMSE (mmHg) over 10 Folds

| Rate | Delay | SS | | ISS | | WMS | |
|---|---|---|---|---|---|---|---|
| (Hz) | Size | Filt | Raw | Filt | Raw | Filt | Raw |
| 5 | 5 | 6.9 | 8.2 | 6.5 | 8.0 | 6.5 | 7.3 |
| 5 | 1 | 10.8 | 16.9 | 10.6 | 14.4 | 10.3 | 12.0 |
| 2 | 2 | 11.0 | 11.4 | 10.8 | 10.9 | 11.1 | 11.3 |
| 2 | 1 | 11.1 | 13.0 | 10.6 | 11.4 | 10.2 | 11.8 |

TABLE 2

Sampling Rate and CPP RMSE for Single Step Linear Regression over 10 Folds

| Rate (Hz) | Mean ± σ (mmHg) | Min (mmHg) | Max (mmHg) |
|---|---|---|---|
| 250 | 1.221 ± 0.182 | 0.871 | 1.411 |
| 125 | 2.049 ± 0.250 | 1.767 | 2.393 |
| 50 | 4.834 ± 0.418 | 4.068 | 5.513 |
| 25 | 8.824 ± 0.948 | 7.465 | 10.507 |
| 10 | 15.097 ± 1.297 | 13.302 | 17.88 |
| 5 | 17.978 ± 1.656 | 14.889 | 21.334 |
| 2 | 13.759 ± 1.469 | 10.589 | 15.303 |
| 1 | 18.335 ± 1.995 | 15.637 | 21.479 |

Sampling Rate: The effect of varying the sampling rate of incoming data may be analyzed. A higher sampling rate intuitively may lead to better single step predictions (since there is less time for the signal to vary widely), but also may make multi-step predictions difficult since a discrete time dynamical system is being modeled. In essence, varying the sampling rate means varying the time-step of the dynamical system. Recursive Least Squares Regression may be applied to a variety of sampling rates using the CPP, Ao, and Force as states, and Distance as the control.

Table 2 shows that the higher the sampling rate is, the lower the RMSE is. The variance of the mean error may also increase as the sampling rate decreases. Note that ultimately, CPP may be predicted over a time horizon, which means that predictions may be propagated through the model many times. A higher sampling rate may imply a smaller timestep, which means the model must be called for a higher number of iterations for an equivalent time. The effect of sampling rate on windowed multi-step predictions is given in Table 3. The lower the sampling rate, the less stable multi-step windowed predictions are. The windows are 25 timesteps long. This is not always the case, as evidenced by the minimum RMSE values, however stability of multi-step predictions is an important aspect for choosing an appropriate sampling rate.

TABLE 3

Sampling Rate and CPP RMSE for Multi Step Linear Regression over 10 Folds

| Rate (Hz) | Mean ± σ (mm Hg) | Min (mmHg) | Max (mmHg) |
|---|---|---|---|
| 250 | 8.644 ± 1.429 | 7.104 | 11.511 |
| 125 | 11.567 ± 2.117 | 7.825 | 14.442 |
| 50 | 14.136 ± 3.830 | 8.429 | 21.437 |
| 25 | 4.588e+06 ± 1.451e+07 | 10.474 | 4.59e+07 |
| 10 | 2.769e+05 ± 8.756e+05 | 12.942 | 2.77e+06 |
| 5 | 9.814e+07 ± 3.1035 + 08 | 14.536 | 9.81e+08 |

TABLE 3-continued

Sampling Rate and CPP RMSE for Multi Step Linear Regression over 10 Folds

| Rate (Hz) | Mean ± σ (mm Hg) | Min (mmHg) | Max (mmHg) |
|---|---|---|---|
| 2 | 3.500e+05 ± 1.057e+06 | 23.488 | 3.36e+06 |
| 1 | 2.882e+11 ± 9.114e+11 | 18.639 | 2.88e+12 |

Figure 5:
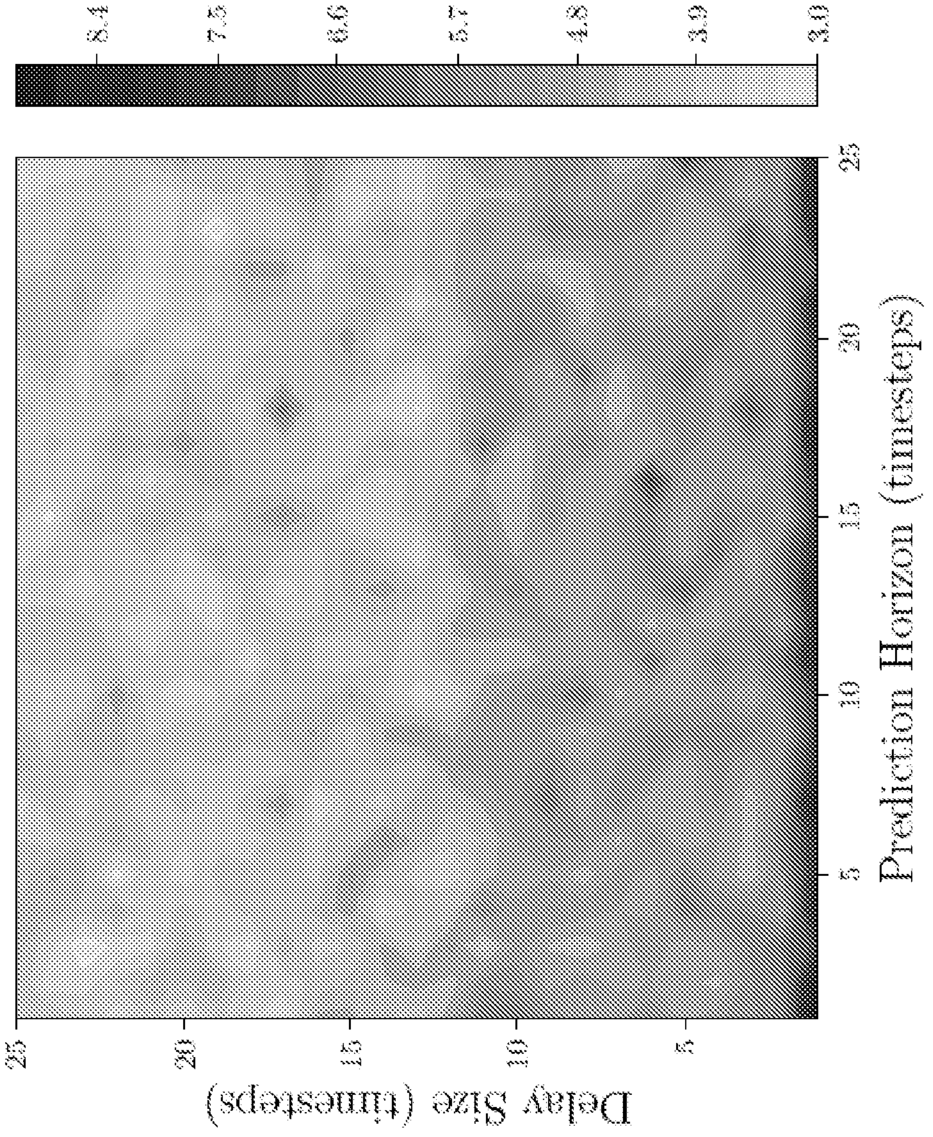
FIG. 5 is a graph illustrating an example linear regression single step root mean squared error (RMSE) comparison of delay and prediction horizon, in accordance with one or more techniques of this disclosure.

Delay Size and Predication Horizon: due to the nonlinear nature of the system being modeled, there may be delays in the system that can be captured. FIG. 5 is a contour plot depicting the RMSE surface of single step predictions when varying the number of timesteps included into the state, as well as the number of timesteps predicted. Each point in the figure may be run over 10 folds, and the average error may be saved. In one example, the prediction error is lowest at the brighter points in the plot. Additionally, a steady increase in RMSE may be observed as the delay size decreases, and as the prediction size increases.

An N-fold cross validation approach may be taken to assess the performance of each algorithm. In one example, the number of training patients per fold is approximately 71, and the number of test patients per fold is approximately 4. For the 71 training patients and a sampling rate of 25 Hz, there are 1.6 million training points for use during the initial optimization. In some examples, the dataset may be vast, which is beneficial, however there may be a large variance between each patient. In one example, between regressors the Root Mean Squared Error is utilized:

$$RMSE = \sqrt{\frac{1}{T}\sum_{i=0}^{T}(w_i - \hat{w}_i)^2}$$

where w represents the true CPP over a given CPR time horizon T and ŵ is the predicted CPP over a given CPR time horizon.

Figure 6:
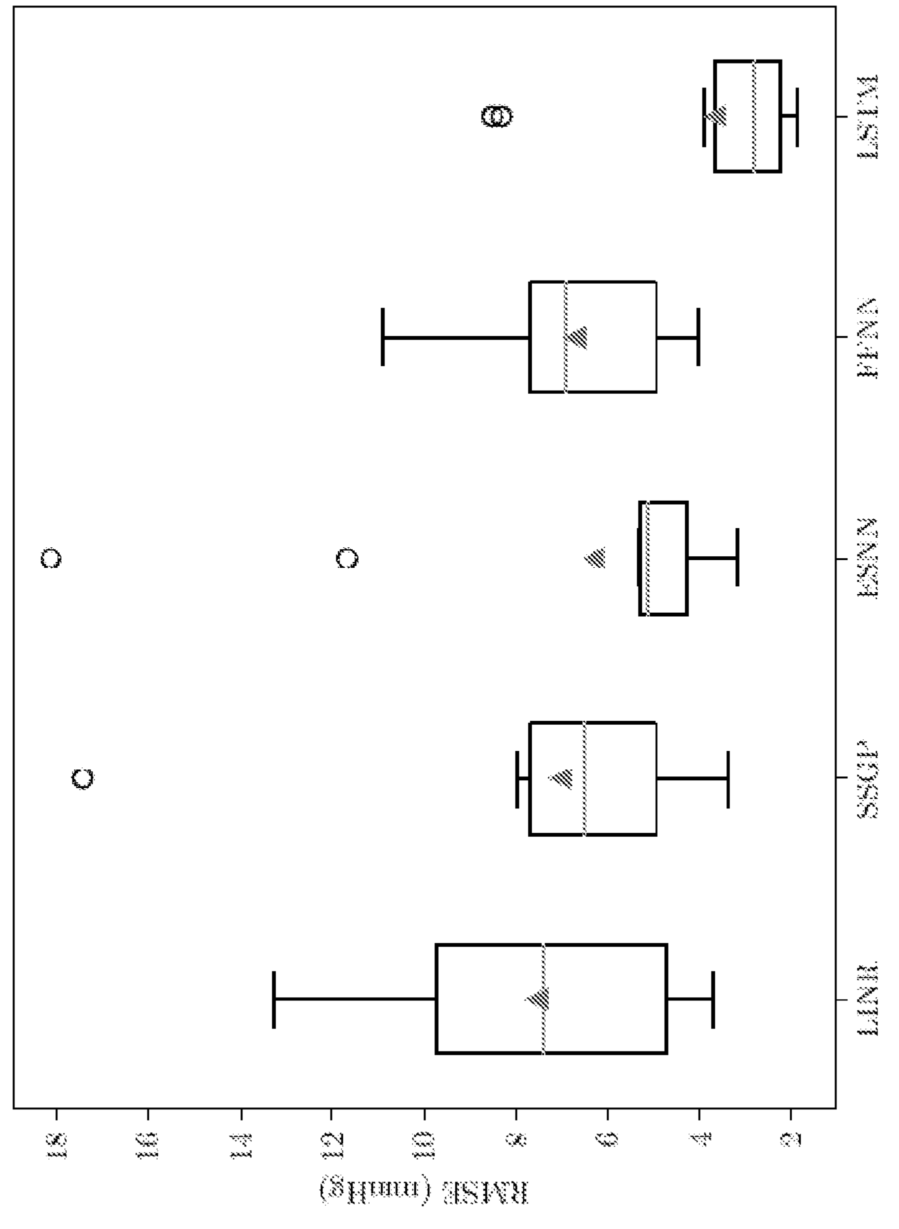
FIG. 6 is a graph illustrating an example single step RMSE for sampling rate 25 Hz and delay size 1 time-step over 12 patients for multiple example learning and prediction methods, in accordance with one or more techniques of this disclosure.
Figure 7:
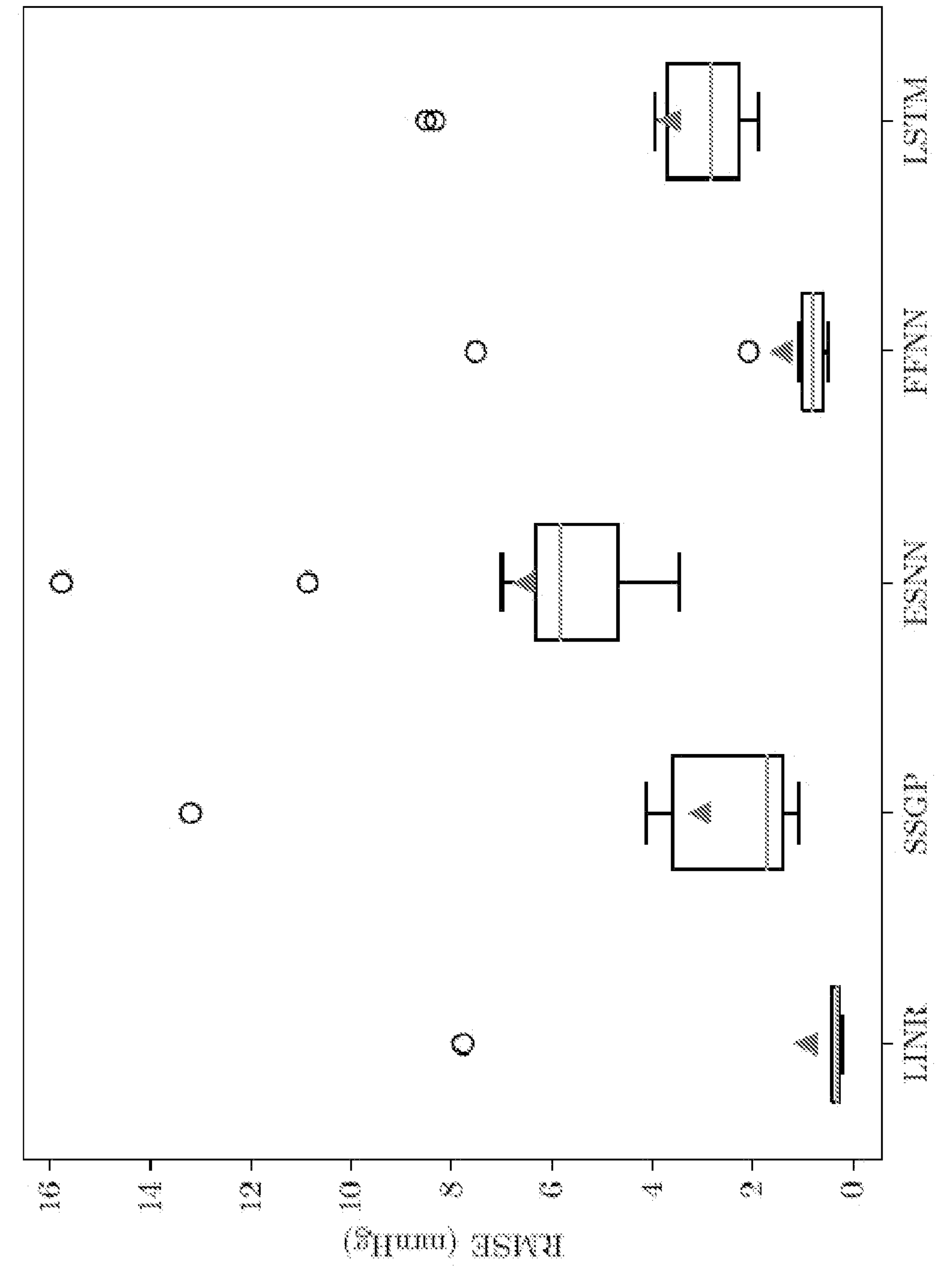
FIG. 7 is a graph illustrating an example single step RMSE for sampling rate 25 Hz and delay size 25 time-steps over 12 patients for multiple example learning and prediction methods, in accordance with one or more techniques of this disclosure.

Single step predictions may be performed with each regression technique. In some examples, delays are not incorporated into the system to get a base performance criteria. FIG. 6 shows that the LSTM performs the best, with its mean, median and range being approximately 2 mmHg RMSE below the other regressors. This performance is followed by the echo state network. These are the two methods that represent recurrence in the prediction. This result changes when incorporating a 1-second delay, explicitly in FIG. 7. For the given sampling rate and delay size, the simplest method of Linear Regression is extremely competitive, and the FFNN RMSE has also improved significantly. The SSGP does not benefit as much because of an increase in input features, and corresponding increase in difficultly in hyperparameter optimization. The effects of a large hyperparameter search space can be seen in Table 4. The signal variance hyperparameter for each output is a representation of how much noise there is in the target data. A high signal variance assumes that most of the high frequency features in a target data set are noise. There is a wide range of hyperparameters for every fold, which indicates the optimization space is highly non-convex and it appears that the optimization method of choice struggles to find a consistent local minimum. LBFGS, RPROP, and SGD-Scaled Conjugate gradient may be tried on a set of 1000 randomly selected points from a training set of 5 random patients. In all cases the optimizers fit the signal variance to be high: between 60-100. This can explain poor GP performance since the hyperparameters attempt to explain the features in the data as noise, and predictions revert back to the prior, which is a zero mean Gaussian. This issue may be overcome through normalization of the input data (centering the data, then scaling it to have unit variance), however this lead to poorer performance during multi-step testing.

Figure 8:
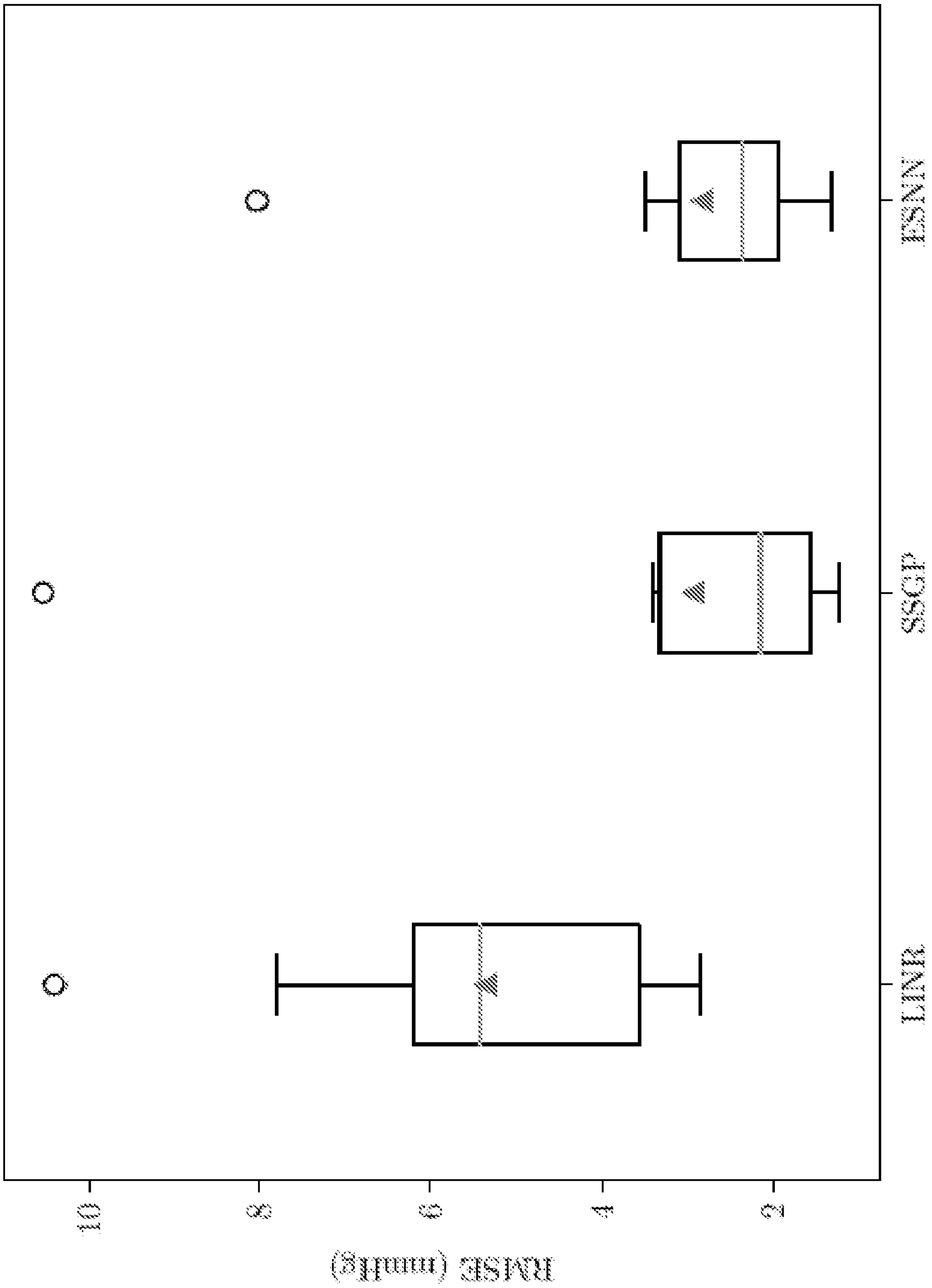
FIG. 8 is a graph illustrating an example incremental single step RMSE for sampling rate 25 Hz and delay size 1 time-step over 12 patients for multiple example learning and prediction methods, in accordance with one or more techniques of this disclosure.
Figure 9:
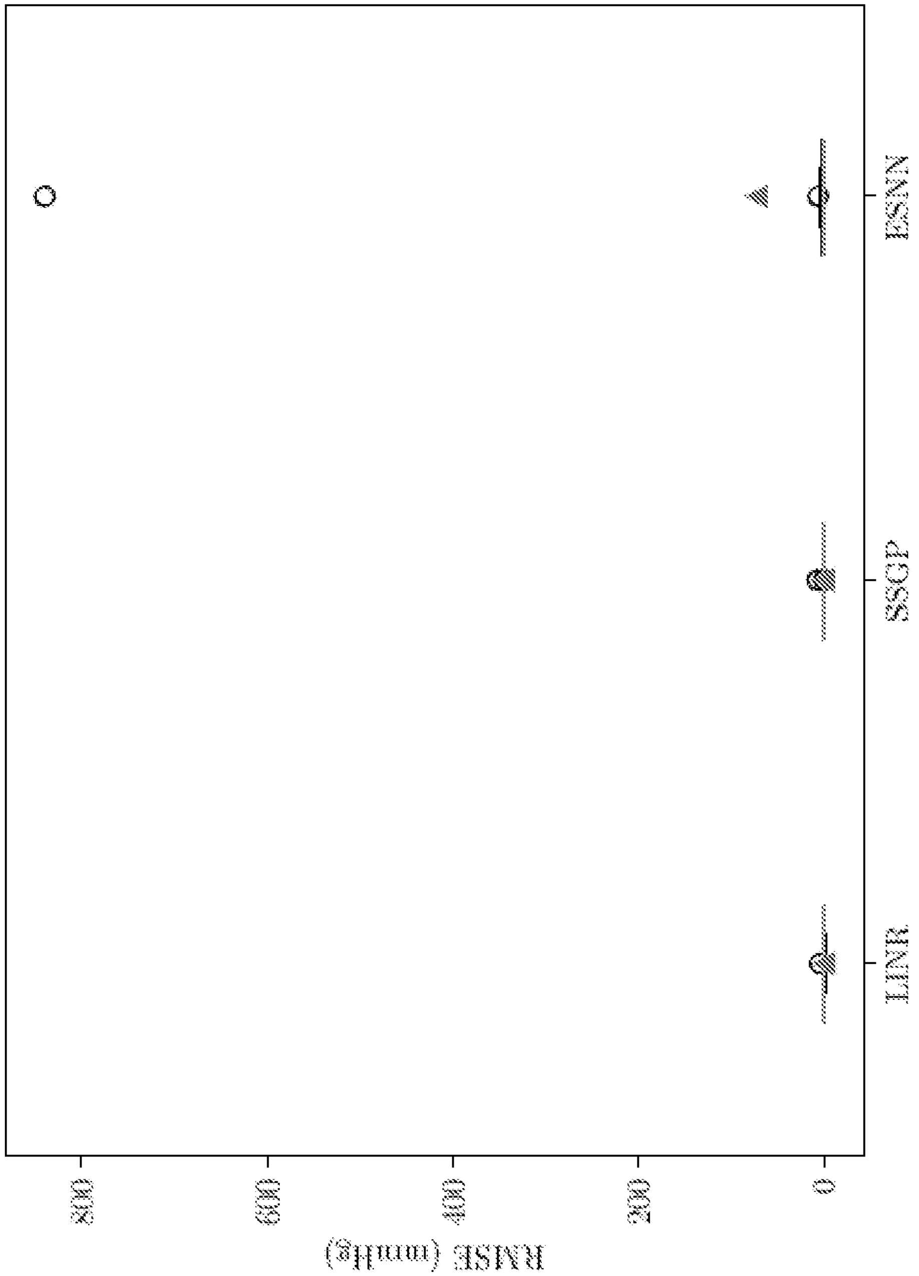
FIG. 9 is a graph illustrating an example incremental single step RMSE for sampling rate 25 Hz and delay size 25 time-steps over 12 patients for multiple example learning and prediction methods, in accordance with one or more techniques of this disclosure.

For the incremental update test cases, LINR, ESNN, and SSGP algorithms may be analyzed. As seen in FIG. 8 the SSGP and ESNN may outperform the simpler linear regression. Again, this is due to the higher predictive power of the SSGP, and the reservoir in the echo state. When incorporating delayed states, however, FIG. 9 shows that LINR and SSGP are both more robust than the echo state network. It is clear that, locally, the dynamics may be approximated as linear to perform short term predictions. However, applications of these regressors become far more interesting for long-term predictions, which could be used for diagnostics or active CPR.

TABLE 4

SSGP Signal Variance Hyper Parameters, 1 per input dimension for Delay Size 5

| Fold | Filt CPP | Raw CPP | Ao | Force |
|---|---|---|---|---|
| 1 | 119.211 | 113.257 | 91.812 | 148.733 |
| 2 | 66.026 | 59.901 | 84.306 | 63.077 |
| 3 | 56.401 | 56.983 | 71.789 | 56.93 |
| 4 | 104.622 | 116.08 | 74.31 | 121.496 |
| 5 | 104.425 | 127.16 | 39.045 | 125.168 |
| 6 | 38.962 | 60.963 | 74.669 | 55.184 |
| 7 | 74.135 | 76.948 | 31.32 | 76.068 |
| 8 | 107.152 | 123.393 | 33.781 | 135.833 |
| 9 | 108.676 | 106.843 | 76.204 | 121.555 |
| 10 | 65.896 | 71.167 | 49.682 | 65.647 |

Figure 10:
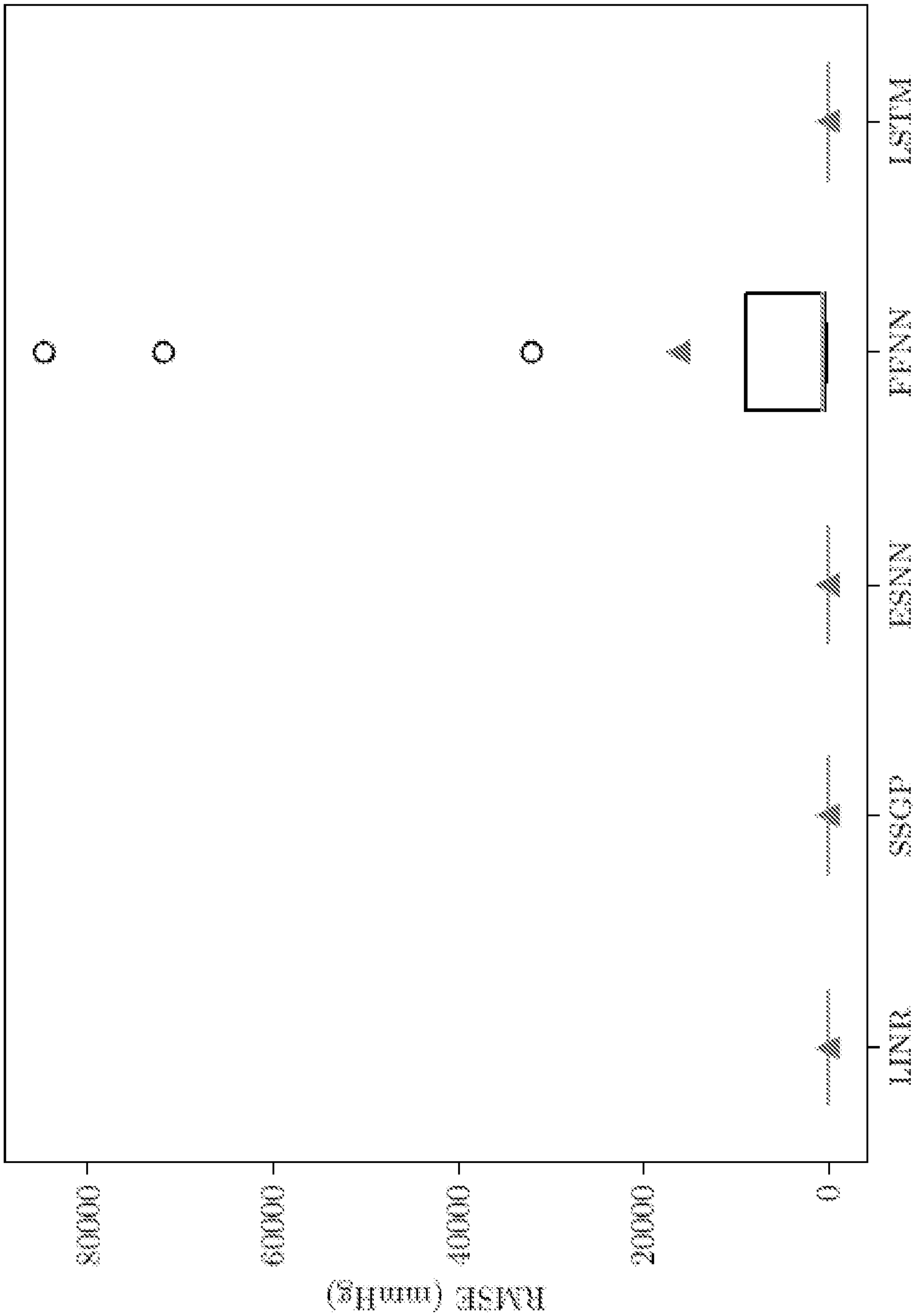
FIG. 10 is a graph illustrating example multi-step predictions over 40 seconds for 12 patients for multiple example learning and prediction methods, in accordance with one or more techniques of this disclosure.
Figure 11:
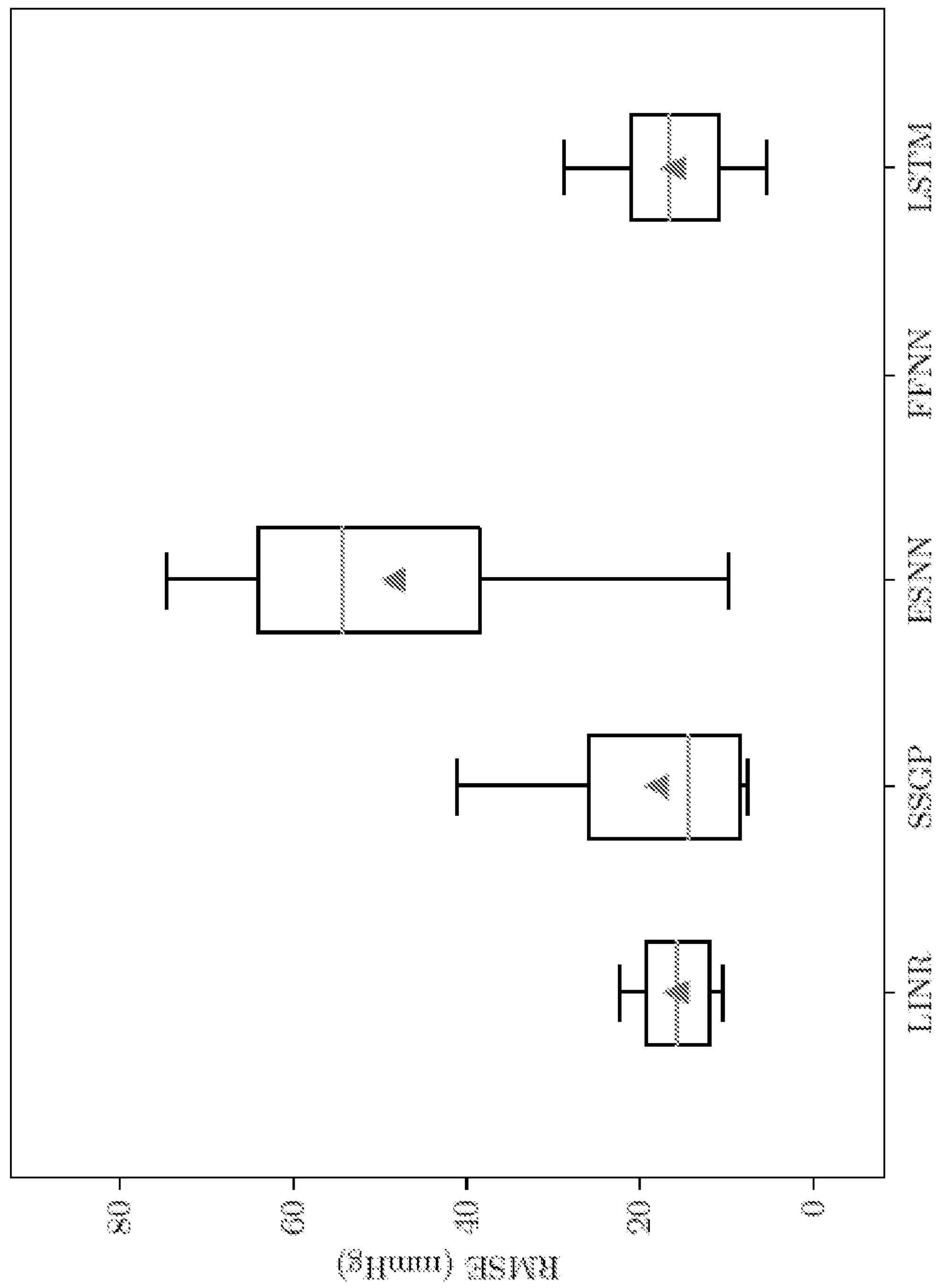
FIG. 11 is a graph illustrating example multi-step predictions over 40 seconds for the 12 patients of FIG. 9 and shown for lower pressures for multiple example learning and prediction methods, in accordance with one or more techniques of this disclosure.

For the multi-step predictions there may be large variation in each of the regressors. Each test may be conducted by starting the time window at the middle of a CPR trajectory (for a given patient), then predicting the CPP for 1000 timesteps (40 seconds). A low RMSE may not be expected, instead the stability of predictions and relative performance between methods may be analyzed. FIG. 10 shows that the feedforward neural network diverges, likely due to overfitting on the training set. Since this disrupts the scale of the other regressors, FIG. 11 shows an altered scale at lower pressures than in FIG. 10. The minimum best performance is demonstrated by the LSTM, as expected, although followed closely by the SSGP, and the LINR. These multi-step results highlight the fact that although the dynamics may appear locally linear, there is nonlinear time-dependent phenomena that can be captured. Note that the delay states may be used in the multi-step prediction comparison, and the LSTM may be able to leverage its recurrence to outperform the other methods. The ESNN did not do as well as the other methods; this is likely due to the randomization of the internal weights. In this case, there may not have been enough data to fulfill the echo state property.

For single step predictions, the system can be modeled extremely well by a delayed linear system, in one example. This implies that the hemodynamics for a specific CPR cycle are heavily correlated with the previous CPR cycle, and the dynamics are locally linear. This assumption clearly breaks down when performing long-term predictions. Long-term, physiological or biomechanical changes in the thoracic cavity elasticity can often cause changes that must be accounted for by a given prediction algorithm. In general, it may be difficult to guarantee the performance of long-term predictions, especially with a delayed linear system. For this reason, more expressive statistical models may be used. In one example, SSGP with Squared-Exponential kernel may be a decent choice of regression method if hyperparameter training is done correctly. Other choices of kernels, especially those that are non-stationary could better explain the data, particularly given its periodicity. The Echo State Network has memory in the form of the abstract hidden state, and this is advantageous in some cases, particularly if delays are not explicitly known. However, the ESNN may not have the capacity to capture features that are many timesteps in the past, thus the multi-step predictions may diverge for long time horizons. The FFNN may have low RMSE for single-step predictions, and it may be able to leverage explicitly delayed states even further through a higher predictive capacity, however one must be careful during training to not overfit to the training data, causing poor generalization performance. Finally, the LSTM network may perform very well in the single step prediction tasks, and given enough training data and time, it may perform long-term multi-step predictions accurately.

In some examples, the system can leverage the LSTM network in an LSTM autoencoder decoder system. For example, such a LSTM autoencoder decoder system may leverage the fact that the information contained in a time series (e.g., the measurements that are recorded from a patient over time) can be compressed into a lower dimensional representation using an autoencoder. For a time series, the system can train a neural network, such as a Long-Short-Term-Memory (LSTM) neural network to propagate the time series forward in time when the information contained in this time series is compressed into this lower dimensional representation. The resulting network size of the LSTM system propagating the lower dimensional representation is therefore smaller than the standard LSTM network, which can reduce the required memory size and computational power required by the system to run the LSTM network. After the system completes the forward propagation of the time series, the system can employ a decoder (e.g., hardware or software decoder) configured to transform the lower dimensional representation back to the original dimensionality (e.g., the dimensions of the determined future potential measurements of the patient). The system can then utilize the future potential measurements for analysis and control of interventional devices for the patient (e.g., medical device 108 of system 100).

Figure 12:
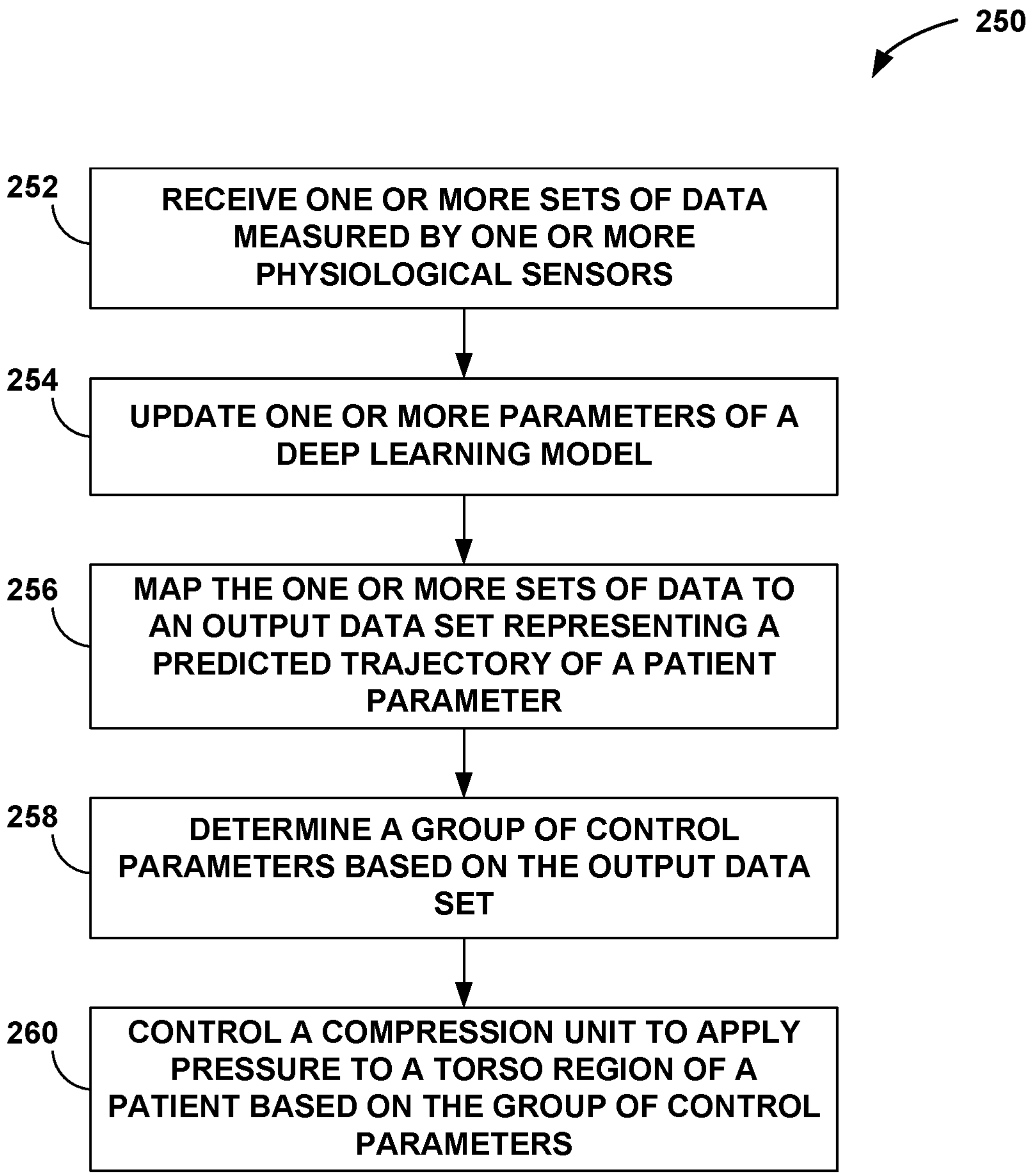
FIG. 12 is a flow diagram illustrating an example process of controlling physiological parameters of a patient, in accordance with one or more techniques of this disclosure.

FIG. 12 is a flow diagram illustrating an example process 250 of controlling a compression unit to apply pressure to a patient. For purposes of illustration only, FIG. 12 is described below within the context of system 100 of FIG. 1, but other systems and devices may be used in other examples. The example technique of FIG. 12 includes receiving one or more sets of data measured by one or more physiological sensors (252). For example, processing circuitry 160 may receive one or more sets of data measured by one or more physiological sensors (e.g., sensor(s) 150). Sensor(s) 150 may include one or more pressure sensors (e.g., piezoelectric pressure sensors, intraosseous pressure sensors, intrathoracic pressure sensors, or the like) configured to measure the coronary perfusion pressure of patient 170 and the pressure sensors may be surgically implanted near or within the heart of patient 170 in order to obtain an accurate reading. Furthermore, the one or more physiological sensors may include flow meter sensors, ECG electrodes, fluoroscopic imaging sensors, ultrasound imaging transducers, impedance mapping sensors, infrared imaging sensors, capnography sensors, or other sensors. In some examples the physiological sensors may be physically connected to processor 160 by one or more electrical conductors. In other examples, at least one of the physiological sensors may be wirelessly connected to processing circuitry 160. The one or more sets of data may be received by processing circuitry 160 in real time, providing a current and accurate physiological portrait of patient 170.

After receiving the one or more sets of data, process 250 may update one or more parameters of a deep learning model (254). In some examples, the deep learning model may include a neural network having a plurality of nodes and a plurality of layers. The plurality of nodes may be arranged into the plurality of layers. Connections between pairs of nodes of the plurality of nodes may be defined by weight values. Updating the one or more parameters may include updating the weight values. Additionally, the one or more parameters may include bias values, coefficients, and other numerical inputs to the deep learning model. Since parameters of the deep learning model may be updated in response to the one or more sets of data, the deep learning model may be "trained" based on the real-time physiological data measured from the patient (e.g., patient 170). In other examples, processing circuitry 160 may operate without updating the deep learning model.

Subsequently, process 250 may map the one or more sets of data to an output data set representing a predicted trajectory of a patient parameter (256). In some examples, the patient parameter may be CPP. In other examples, the patient parameter may be other variables relating to the delivery of CPR. Processing circuitry 160 may be configured to map the one or more sets of data to the output data set by inputting the one or more sets of data in addition to candidate control parameters into the deep learning model. In response, the deep learning model may generate the output data set.

Additionally, process 250 may determine a set of control parameters based on the output data set (258). For example, processing circuitry 160 may create a plurality of sets of control parameters based on the output data set. The plurality of sets of control parameters may be selected by processing circuitry 160 based on the output data set. In fact, the plurality of sets of control parameters may be selected as likely producing a favorable outcome with respect to the patient parameter represented by the output data set. Additionally, processing circuitry 160 may calculate a cost value for each set of control parameters of the plurality of sets of control parameters. The cost value may be calculated using a cost function and the cost value may represent a quantified performance metric (e.g., error value). Subsequently, processing circuitry 160 may identify the set of control parameters having the lowest cost value. Processing circuitry 160 may select the set of control parameters having the lowest cost value for controlling medical device 108 to deliver CPR.

In response to determining the set of control parameters, process 250 may control a compression unit to apply pressure to a torso region of a patient based on the set of control parameters (260). The set of control parameters may control compression unit 110 to move according to at least one degree of freedom. For example, compression unit 110 may move within a space having three axes—an x-axis, a y-axis, and a z-axis. The set of control parameters may govern movements of compression unit 110 within the space.

The at least one degree of freedom may include a first linear degree of freedom. The first linear degree of freedom may allow the compression unit to move perpendicular to a two-dimensional plane representing the torso of the patient (e.g., parallel to the z-axis). Movement of compression unit 110 may result in anterior to posterior motion with respect to the patient 170). For example, compression unit 110 may move distally along the z-axis towards the torso of patient 170, and additionally may move proximally along the z-axis away from the torso of patient 170. The one or more degrees of freedom may further include a second linear degree of freedom and a third linear degree of freedom allowing the compression unit to move parallel to the two-dimensional plane (e.g., medial to lateral and cranial to caudal with regard to patient 170). The two-dimensional plane may be representative of the torso of patient 170. In this way, compression unit 110 may apply pressure at various regions of the torso. Furthermore, the one or more degrees of freedom may include rotational degrees of freedom. A first rotational degree of freedom may allow compression unit 110 to rotate about a first axis parallel to the two-dimensional plane and a second rotational degree of freedom may allow compression unit 110 to rotate about a second axis parallel to the two-dimensional plane. In one example, the first axis is perpendicular to the second axis. Compression unit 110 is configured to alter a direction in which it applies pressure to the torso of patient 170 by moving within the one or more degrees of freedom.

Figure 13:
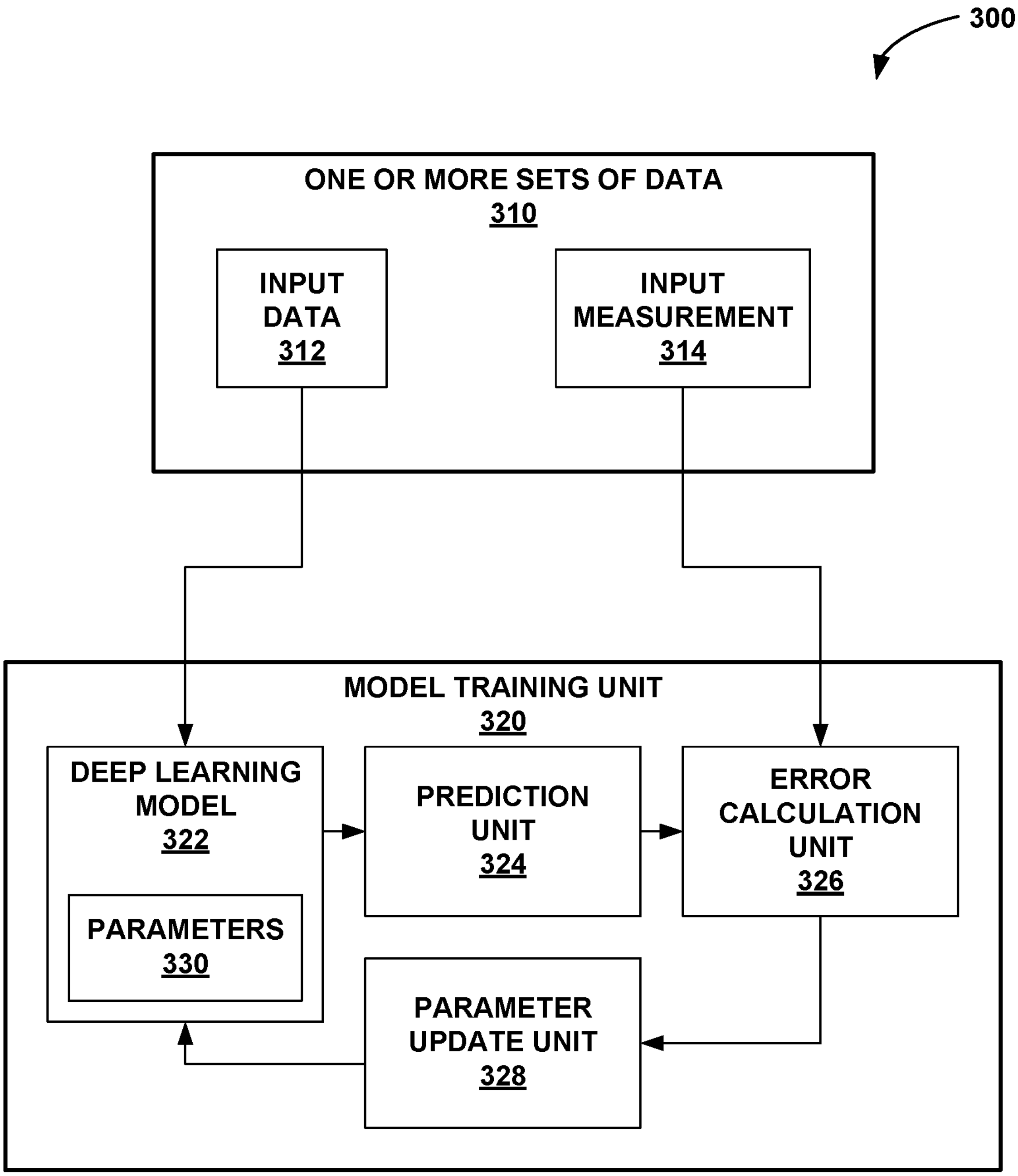
FIG. 13 is a block diagram illustrating an example system configured to update one or more parameters of a deep learning model, in accordance with one or more techniques of this disclosure.

FIG. 13 is a block diagram illustrating a system 300 for updating one or more parameters of deep learning model 322. As illustrated in the example of FIG. 12, system 300 includes one or more sets of data 310 and model training unit 320. Model training unit 320 may include processing circuitry 160 or be executed by processing circuitry 160 in some examples. One or more sets of data 310 may produce input data 312 and input measurement 314. Model training unit 320 may include and/or execute deep learning model 322, prediction unit 320, error calculation unit 326, and parameter update unit 320. Deep learning model 322 may be defined by parameters 330.

One or more sets of data 310 may be measured by one or more physiological sensors, such as sensor(s) 150 of FIG. 1. The one or more physiological sensors may include at least one of piezoelectric pressure sensors, intraosseous pressure sensors, flow meter sensors, ECG electrodes, fluoroscopic imaging sensors, ultrasound imaging transducers, impedance mapping sensors, infrared imaging sensors, intrathoracic pressure sensors, or capnography sensors. In one example, at least some of one or more sets of data 310 are measured by physiological sensors implanted within a patient. Additionally, or alternatively, at least some of one or more sets of data 310 are measured by non-invasive physiological sensors placed on a patient (e.g., ECG electrodes, ultrasonic imaging transducers, etc.).

Model training unit 320 may receive one or more sets of data 310 to perform incremental updates in real time. Prediction unit 324 may calculate, using deep learning model 322, a set of predicted values based on input data 312 of the one or more sets of data 310. Deep learning model 322 may include parameters 330, which guide the calculation of the set of predicted values. In one example, deep learning model 322 may include a plurality of nodes arranged in one or more layers, and parameters 330 may include weight values of connections between the plurality of nodes. In other examples, parameters 330 may include other coefficients affecting the calculation of the set of predicted values. In some examples, deep learning model 322 includes recursive linear regression algorithms, sparse spectrum gaussian processes, neural networks (e.g., feedforward neural networks or recurrent neural networks), or the like.

Error calculation unit 326 may calculate a set of error values based on the set of predicted values calculated by prediction unit 324 and one or more sets of data 310. In one example, error calculation unit 326 may calculate the set of error values by quantifying the error between the set of predicted values and input measurement 314 of the one or more sets of data 310. In other words, input measurement 314 represents a "real" value of one or more sets of data 310 and the set of predicted values represents a forecast of one or more sets of data 310 based on deep learning model 322. The set of error values represent an error of the set of predicted values relative to the one or more sets of data 310. In some examples, input measurement 314 may be output data generated by a physiological sensor after input data 312. In other words, input data 312 may be a value for a patient parameter prior to the value of the patient parameter represented by input measurement 314 that may have been changed due to the progress of CPR provided by a compression unit and/or anther medical device.

Parameter update unit 328 may update one or more parameters of parameters 330 based on the set of error values calculated by error calculation unit 326. Parameter update unit 328 may update the one or more parameters to decrease future error values, thus "training" deep learning model 322 to accurately predict future values of the one or more sets of data 310. As model training unit 320 receives the one or more sets of data 310 in real time, deep learning model 322 may be continuously trained (e.g., parameters 330 may be continuously updated). Based on control parameters derived from both the controller and deep learning model 322, a medical device such as medical device 108 of FIG. 1 may perform CPR on a patient.

Figure 14:
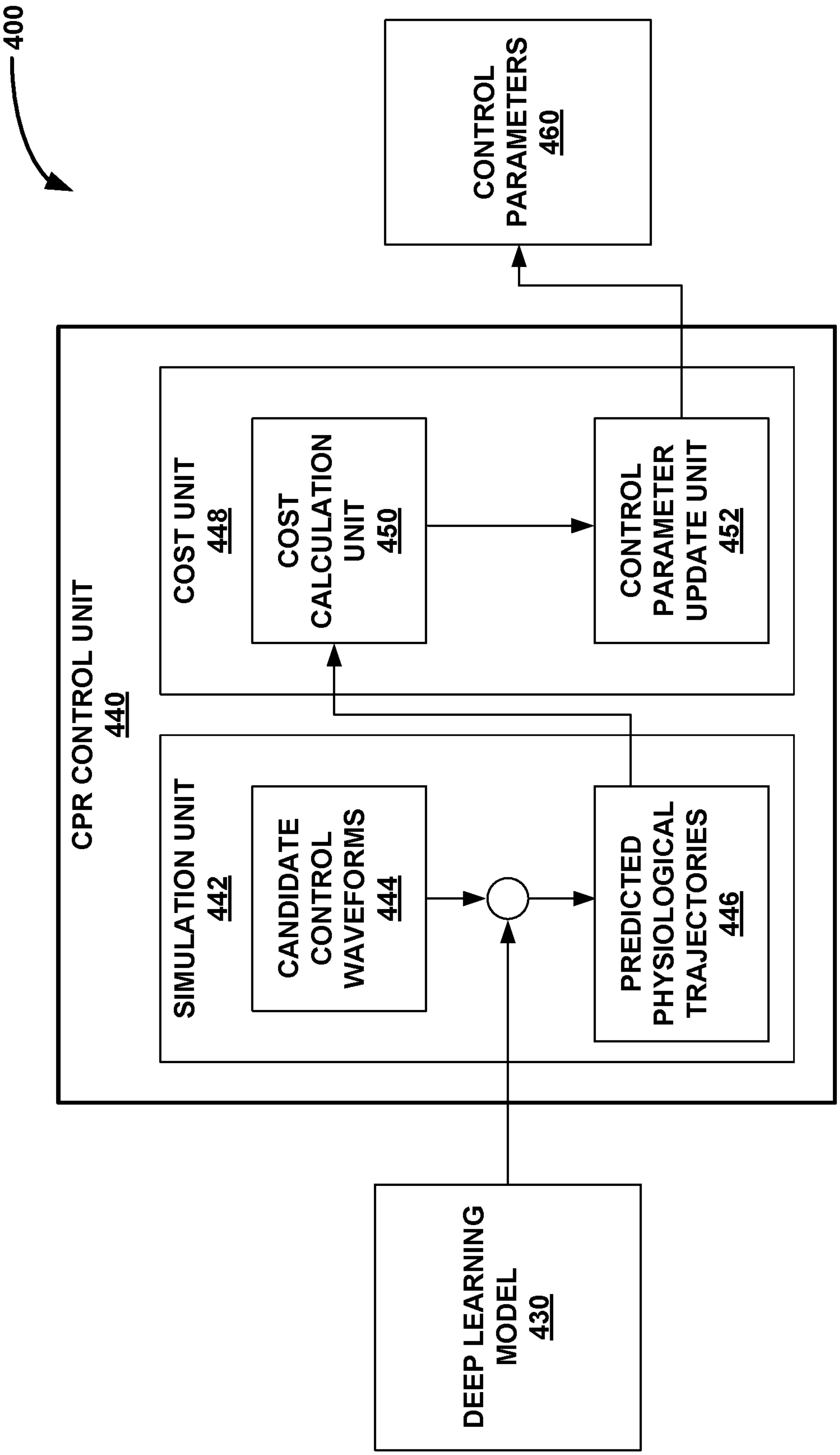
FIG. 14 is a block diagram illustrating a system configured to determine a set of one or more control parameters, in accordance with one or more techniques of this disclosure.

FIG. 14 is a block diagram illustrating a system 400 for determining control parameters 460. As illustrated in FIG. 14, system 400 includes deep learning model 430, control unit 440, and control parameters 460. CPR control unit 440 includes simulation unit 442 and cost unit 448. Simulation unit 442 includes CPR candidate control waveforms 444 and predicted physiological trajectories 446. Cost unit 448 includes cost calculation unit 450 and control waveform update unit 452. In some examples, processing circuitry 160 may include and/or execute components such as model training unit 320 and/or CPR control unit 440.

Deep learning model 430 may deliver output indicative of a predicted trajectory of one or more patient parameters. In some examples, the one or more patient parameters may include CPP of the patient. CPR control unit 440 may receive the data indicative of the one or more patient parameters. In some examples, simulation unit 442 may create predicted physiological trajectories 446 based on the data indicative of the one or more patient parameters and candidate control waveforms 444. Predicted physiological trajectories 446 may be a plurality of sets of control parameters that may increase a likelihood of patient survival when used to direct a medical device to perform CPR on the patient. In some examples, predicted physiological trajectories 446 may include about 10,000 sets of control parameters. In other examples, predicted physiological trajectories 446 may include more than about 10,000 sets of control parameters or less than about 10,000 sets of control parameters.

After simulation unit 442 creates sets of output data, cost calculation unit 450 may calculate a cost value for each set of candidate control parameters and output data. The cost value may be calculated using a cost function. The cost value may represent relevant performance metrics. Subsequently, cost unit 448 may update candidate control waveforms 444 using control waveform update unit 452. Control waveform update unit 452 may use Bellman's dynamic programming principle to update candidate control waveforms 444. Cost unit 448 may identify the set of control parameters of predicted physiological trajectories 446 having the lowest cost value. CPR control unit 440 may determine control parameters 460 as the set of parameters having the lowest cost value. The lowest cost value sets of control parameters used to update the control parameters may increase the quality level of CPR delivered to a patient. Control parameters 460 may be used to control a medical device, such as medical device 108 of FIG. 1, to perform CPR on a patient.

Figure 15:
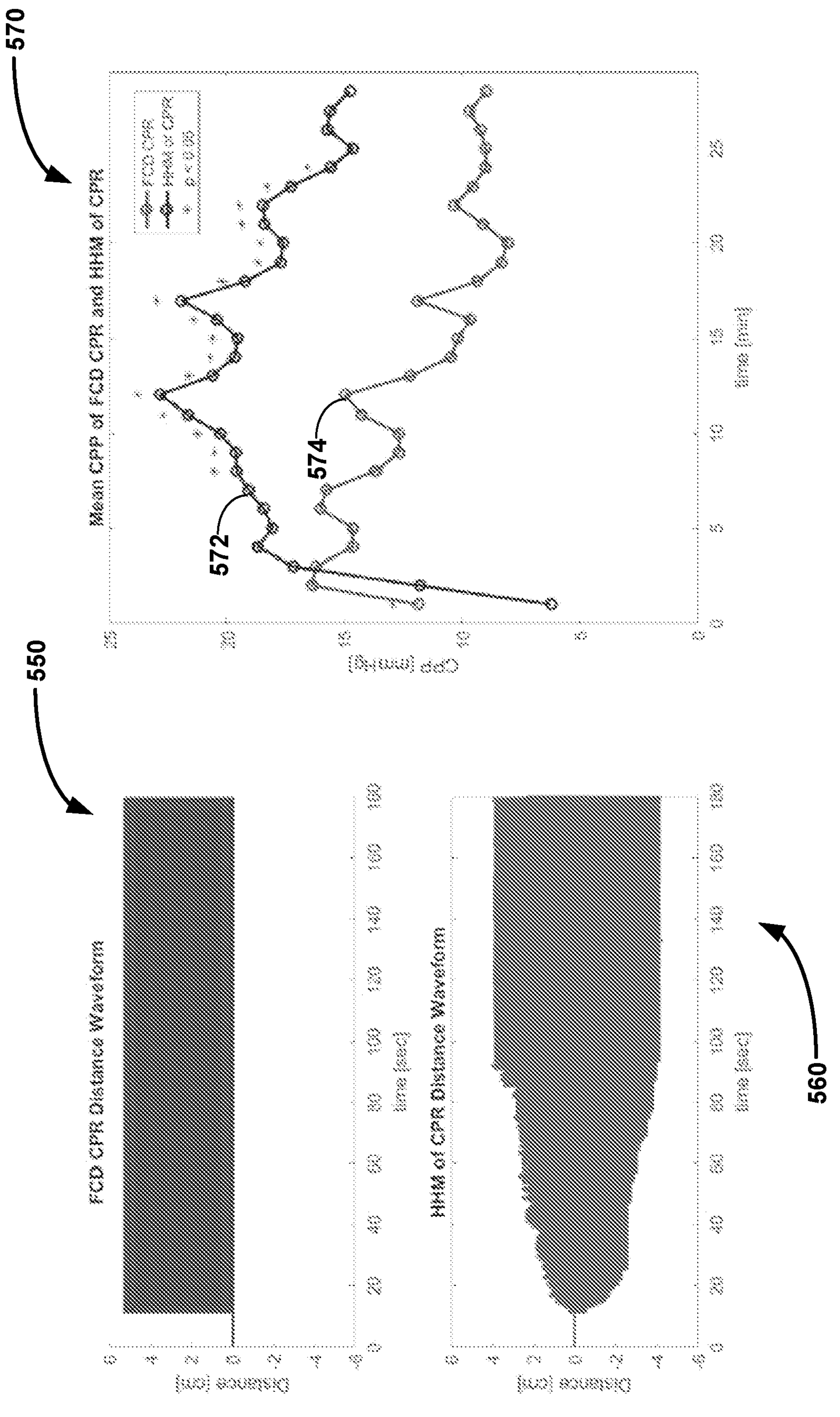
FIG. 15 is a set of graphs illustrating one or more example differences between fixed compression depth (FCD) CPR and a human intelligence method of CPR (HHM of CPR), in accordance with one or more techniques of this disclosure.

FIG. 15 is a set of graphs 550, 560, and 570 illustrating one or more differences between fixed compression depth (FCD) CPR and a human intelligence method of CPR (HHM of CPR), wherein a human user was able to modulate the depth of compression and decompression during CPR, in response to real-time physiological measurements. In some examples, a heuristic human biofeedback CPR method may improve CPP compared to fixed compression depth (FCD) mechanical CPR during prolonged resuscitation efforts. CPR is the cornerstone of pre-hospital management of cardiac arrest. However, the high mortality and residual disability rate in cases of prolonged CPR mandate the investigation of novel methods to improve CPR quality.

Graphs 550, 560, and 570 show that a heuristic, human intelligence method of CPR (HHM of CPR), targeting CPP optimization, may improve CPP compared to a fixed compression depth mechanical CPR device in cases of cardiac arrest. The data shown in FIG. 15 were derived from an experiment in which 16 pigs received electrically induced ventricular fibrillation and underwent mechanical CPR with continuous hemodynamic monitoring. A LUCAS™ device was used to treat 6 animals with fixed compression depth CPR (FCD CPR), while the remaining pigs received CPR with a mechanical piston that permits continuous adjustment to compression and decompression depth, according to real-time CPP readings (HHM of CPR). Human operators adjusted compressions to optimize CPR with respect to CPP. After 10 minutes of basic life support, both groups of pigs received epinephrine every 5 minutes. Arterial Blood gases were collected every 5 minutes. After 30 minutes of CPR the animals were defibrillated and received up to 3 shocks.

6 of 10 pigs achieved return of spontaneous circulation in the HHM of CPR cohort as compared to 1 of 6 pigs in the FCD CPR cohort ($p=0.03$). The HHM of CPR (572) improved CPP throughout the duration of the study ($p<0.05$), as shown in graph 570. Moreover, the FCD CPR (574) cohort was highly dependent on epinephrine administration for maintenance of adequate perfusion. No difference was noted in terms of pH or Lactate. HHM of CPR led to the selection of negative decompression piston travel (active decompression) and to shallower compression depths. In addition, the total piston distance traversed using the HHM of CPR was greater compared to the mechanical FCD CPR method (8.2 cm vs 5.3 cm, $p<0.05$), permitting higher perfusion without reaching potentially traumatic compression depths. As such, a human heuristic method of CPR, targeting higher CPP with continuous modulation of compression and decompression, may lead to the selection of active decompression and shallower depth of compression in order to increase CPP, and may achieve better CPP compared to a fixed depth mechanical CPR method during prolonged CPR.

Figure 16:
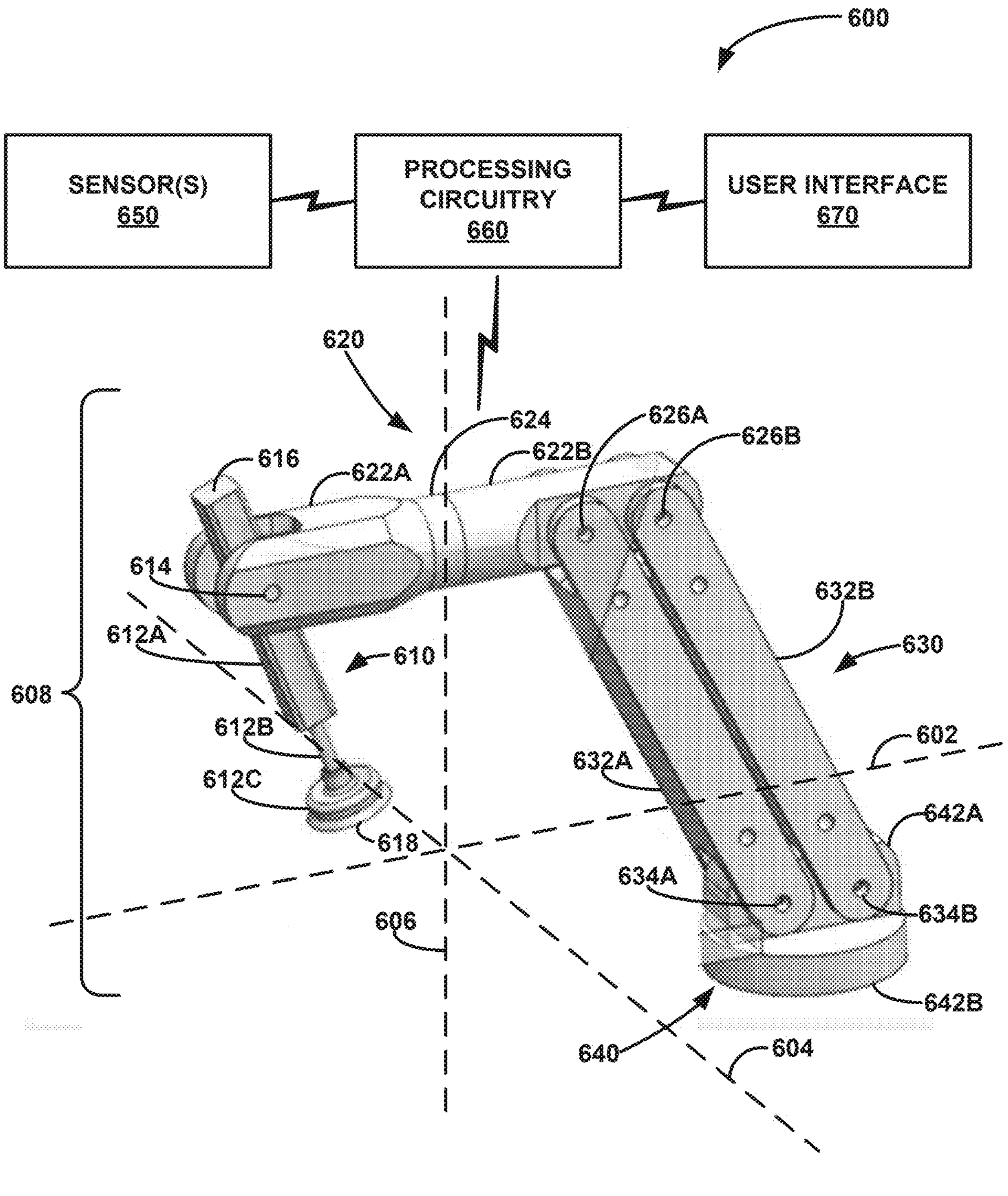
FIG. 16 is a conceptual diagram illustrating an example system for monitoring and treating conditions using CPR, in accordance with one or more techniques of this disclosure.

FIG. 16 is a conceptual diagram illustrating an example system 600 for monitoring and treating conditions using CPR, in accordance with one or more techniques of this disclosure. System 600 may be similar to system 100 of FIG. 1. As illustrated in the example of FIG. 16, system 600 may be a medical system that includes medical device 608, sensor(s) 650, processing circuitry 660, and user interface 670. Medical device 608 includes compression unit 610, first arm 620, second arm 630, and base unit 640.

Medical device 608 may be configured to treat one or more medical conditions of a patient by performing CPR, the medical conditions including but not limited to cardiac arrest and/or agonal breathing. Medical device 608 may be configured for use in the field and/or medical facilities (e.g., ambulances, clinics, hospitals, or the like), and medical device 608 may be configured to be operated by clinicians, healthcare professionals, or bystanders in some examples. In some examples, medical device 608 may continue CPR on a patient after CPR is performed by a bystander shortly after the patient becomes unresponsive due to cardiac arrest. Medical device 608 may continue administering CPR prior to, during, and after surgery.

Compression unit 610 may be configured to apply pressure to a surface (e.g., a torso region) of a patient. In the example of FIG. 16, Compression unit 610 may extend along a longitudinal axis from proximal end 616 to distal end 618. Although depicted as a static component in FIG. 16, compression unit 610 may be configured to move within a three-dimensional space defined by x-axis 602, y-axis 604, and z-axis 606. In the example illustrated in FIG. 16, x-axis 602 is perpendicular to y-axis 604. Additionally, z-axis 606 is orthogonal to both x-axis 602 and y-axis 604. The design illustrated in FIG. 16 allows rotation about the aforementioned axes in addition to linear movement along the axes.

Compression unit 610 includes first compression unit portion 612A, second compression unit portion 612B, and third compression unit portion 612C (collectively, "compression unit portions 612"). First compression unit portion 612A may represent an elongated member that extends from the proximal end 616 of compression unit 610 to a distal end of first compression unit portion 612A. Additionally, first compression unit portion 612A may define a lumen (not illustrated in FIG. 16) that extends along the longitudinal axis for at least a portion of first compression unit portion 612A. The lumen, in some examples, may be configured to receive at least a portion of second compression unit 612B. In some examples, third compression unit portion 612C is fixed to a distal end of second compression unit portion 612B such that third compression unit portion 612C moves with second compression unit portion 612B. For example, a position of second compression unit portion 612B within the lumen of first compression unit portion 612A may be configured to change over time such that first compression unit portion 612A, second compression unit portion 612B, and third compression unit portion 612C act as a piston.

In one example, compression unit 610 may apply a first pressure to the patient by moving second compression unit portion 612B and third compression unit portion 612C distally along the longitudinal axis (e.g., extending at least a portion of second compression unit portion 612B outside of the lumen of first compression unit portion 612A) towards the torso region of the patient. Additionally, compression unit 610 may apply a second pressure (e.g., reduce the first pressure and/or provide a negative pressure) by moving second compression unit portion 612B and third compression unit portion 612C proximally along the longitudinal axis (e.g., retracting at least a portion of second compression unit portion 612B into of the lumen of first compression unit portion 612A) away from the torso region of the patient. This may be referred to as active decompression in some examples. In some examples, the first pressure comprises "pushing" on the torso region, and the second pressure comprises "pulling" on the torso region. In one example, compression unit 610 may apply the first pressure and the second pressure in a series of pulses, the series of pulses representing a sinusoidal oscillation. In other words, compression unit 610 may oscillate between moving proximally along the longitudinal axis and moving distally along the longitudinal axis at a predetermined frequency. As discussed in further detail below, processing circuitry 660 may control compression unit 610 to oscillate according to control parameters, such as but not limited to an oscillation frequency of the compression unit, an oscillation amplitude of compression unit 610, a duty cycle of the compression unit 610, a maximum applied pressure of compression unit 610, or one or more position parameters corresponding to the at least one degree of freedom. The one or more position parameters may include at least one of a linear velocity of compression unit 610, an angular velocity of compression unit 610, a linear acceleration of compression unit 610, and an angular acceleration of compression unit 610.

In other examples, compression unit 610 may be configured to provide non-sinusoidal oscillations, such as oscillations that may include ramp functions, square waves, or a combination of multiple waveforms for the displacement, speed, and/or accelerations of the movement of a piston of compression unit 610.

In the example illustrated in FIG. 16, the longitudinal axis of compression unit 610 is aligned with z-axis 606. In one example, compression unit 610 may move according to one degree of freedom—proximally and distally along z-axis 606. Alternatively, in other examples, compression unit 610 may move according to more than one degree of freedom, allowing the longitudinal axis to be horizontally displaced from z-axis 606 and allowing the longitudinal axis to rotate such that it forms an oblique angle with z-axis 606 according to one or more techniques described herein.

In some examples, an oblique angle of compression unit 610 and z-axis 606 may be determined at least in port by a joint 614 between compression unit 610 and first arm 620. For example, compression unit 610 may rotate relative to first arm 620 at joint 614, where the rotation at joint 614 is powered by one or more motors (not illustrated in FIG. 16) of medical device 608. In some cases, compression unit 610 may be configured to rotate about a single axis that passes through joint 614. Rotation about other axes may be achieved using one or more other joints of medical device 608. First arm 620 may include first portion 622A and second portion 622B. In the example illustrated in FIG. 16, first portion 622A and second portion 622B are joined at joint 624. In some examples, first portion 624A may rotate at joint 624 about an axis that extends along first arm 620. In some examples, a motor (e.g., an electric motor) controls rotation of first portion 622A at joint 624. Additionally, second portion 622B may be attached to second arm 630 by joint 626A and joint 626B (collectively, "joints 626"). First arm 620 and second arm 630 may rotate relative to each other about an axis extending parallel to joints 626. An angle between first arm 620 and second arm 630 may change based on the rotation of first arm 620 and/or second arm 630 about the axis extending parallel to joints 626.

Third arm 630 may include first beam 632A and second beam 632B (collectively, "beams 632"). Additionally, base unit 640 may include first base unit portion 642A and second base unit portion 642B (collectively, "base unit portions 642"). As seen in FIG. 16, first beam 632A is connected to first arm 620 by joint 626A and second beam 632B is connected to first arm 620 by joint 626B. First beam 632A and second beam 632B may be connected to first base unit portion 642A by joint 634A and joint 634B, respectively. In some examples, a motor (e.g., an electric motor) may control an angle between beams 632 and first base unit portion 642A by causing second arm 630 to rotate about an axis parallel to joints 634. Additionally, first base unit portion 642A may rotate relative to second base unit portion 642B about an axis passing through a center of base unit 640, the axis being parallel to z-axis 606. The rotation of first base unit portion 642A relative to second base unit portion 642B may be controlled by one or more electrical motors. Base unit 640 may rest on a floor, a table, or another surface configured to support medical device 608.

Sensor(s) 650 may include one or more physiological sensors configured to measure one or more physiological signals of a patient and generate sets of data respective of the measured one or more physiological signals (e.g., patient parameters). Sensor(s) 650 may include at least one of pressure sensors (e.g., piezoelectric pressure sensors), intraosseous pressure sensors, flow meter sensors, impedance mapping sensors, intrathoracic pressure sensors, ECG electrodes, and capnography sensors. Sensors 650 may be implantable or external to the patient. In one example, pressure sensors are implanted inside the cardiovascular system of the patient, the pressure sensors measuring CPP of the patient. A plurality of ECG electrodes may be attached to the patient providing a plurality of ECG vectors. In some cases, processing circuitry 660 may determine a location of a heart of the patient by analyzing the plurality of ECG vectors. Capnography sensors may be configured to measure a concentration or partial pressure of $CO_2$ gas, or any other gas respired by the patient. Additionally, or alternatively, sensor(s) 650 may include other physiological sensors configured to measure other sets of physiological data (e.g., aortic pressure, end tidal CO2, tissue pH, tissue oxygen saturation, or the like) of the patient.

In some examples, sensor(s) 650 may include image capture devices, such as x-ray devices, MRI devices, CT scan devices, infrared imaging, ultrasound imaging, impedance mapping, or the like. Data from the image capture devices may be used by processor 660 to determine control parameters governing medical device 608. Sensor(s) 650 may transmit data to processing circuitry 660 via wired and/or wireless communication.

Processing circuitry 660 may include any one or more of a microprocessor, a controller, a DSP, an ASIC, an FPGA, one or multiple GPUs, or equivalent discrete or analog logic circuitry. In some examples, processing circuitry 660 may include multiple components, such as any combination of one or more microprocessors, one or more controllers, one or more DSPs, one or more ASICs, or one or more FPGAs, as well as other discrete or integrated logic circuitry. The functions attributed to processing circuitry 660 herein may be embodied as software, firmware, hardware or any combination thereof.

Although FIG. 16 illustrates processing circuitry 660 apart from medical device 608, in some examples, processing circuitry 660 may be housed in medical device 608. In other examples, processing circuitry 660 may be housed in other components (not illustrated in FIG. 16), and processing circuitry 660 may connect with medical device 608 via wireless communication using any techniques known in the art. Examples of communication techniques may include, for example, low frequency or radiofrequency (RF) telemetry, or according to the Bluetooth® or Bluetooth LE specifications.

A user, such as a clinician or a patient, may interact with medical system 600 through user interface 670. User interface 670 may include a display (not shown), such as an LCD or LED display or other type of screen, with which processing circuitry 660 may present information related to Medical device 608 or sensor(s) 650 (e.g., physiological signals associated with patient collected by sensor(s) 650). In addition, user interface 670 may include one or more input mechanisms to receive input from the user. The one or more input mechanisms may include, for example, any one or more of buttons, a keypad (e.g., an alphanumeric keypad), a peripheral pointing device, a touch screen, or another input mechanism that allows the user to navigate through user interfaces presented by processing circuitry 660 and provide input. In other examples, user interface 670 also includes audio circuitry for providing audible notifications, instructions or other sounds to the patient, receiving voice commands from the patient, or both. A memory (not illustrated in FIG. 16) may include instructions for operating user interface 670.

In some examples, processing circuitry 660 may implement a deep learning model to determine, based on one or more sets of data, a set of control parameters for controlling medical device 608, as described in FIG. 1 with respect to processing circuitry 660. Additionally, or alternatively, processing circuitry 660 may output the one or more sets of data for display on user interface 670. In turn, user interface 670 may receive information indicative of a set of control parameters. Processing circuitry 660 may use the set of control parameters to control movement of medical device 608 such that medical device 608 administers CPR to a patient. Determining the set of control parameters based on user input may be referred to herein as a "Human Heuristic Method (HHM)" of administering CPR.

In the human heuristic method, CPP may be monitored in real-time by a physician user of a variable compression-decompression CPR piston (e.g., compression unit 610 of medical device 608). The physician may observe, on user interface 670, changes in CPP throughout CPR and modify the compression and decompression distances in such a way that the CPP is increased or maintained while administering CPR using medical device 608. The physician may implement physiologic knowledge of the patient (e.g. number of broken ribs, evidence of hemothorax, pneumothorax, and/or internal trauma, volume status of the patient, etc.) as well as heuristic knowledge (e.g., a knowledge that if compression is increased, CPP increases, so medical device 608 is currently under-compressing the patient) to modify the distances of compression and decompression, leading to a more favorable outcome. In this manner, user interface 670 may receive user input from the physician or other medical professional that at least partially defines how medical device 608 operates, and processing circuitry 660 may control medical device 608 at least partially based on values for one or more parameters that define operation of medical device 608.

In some examples, compression unit 610 may have an X-Y range of motion of 15 centimeters (cm). Compression unit 610 may have an X-Y velocity of 10 cm per second. Compression unit 610 may have a Z velocity of 10 cm per second. Additionally, compression unit 610 may have a Z duty cycle of 30%-70%.

Figure 17:
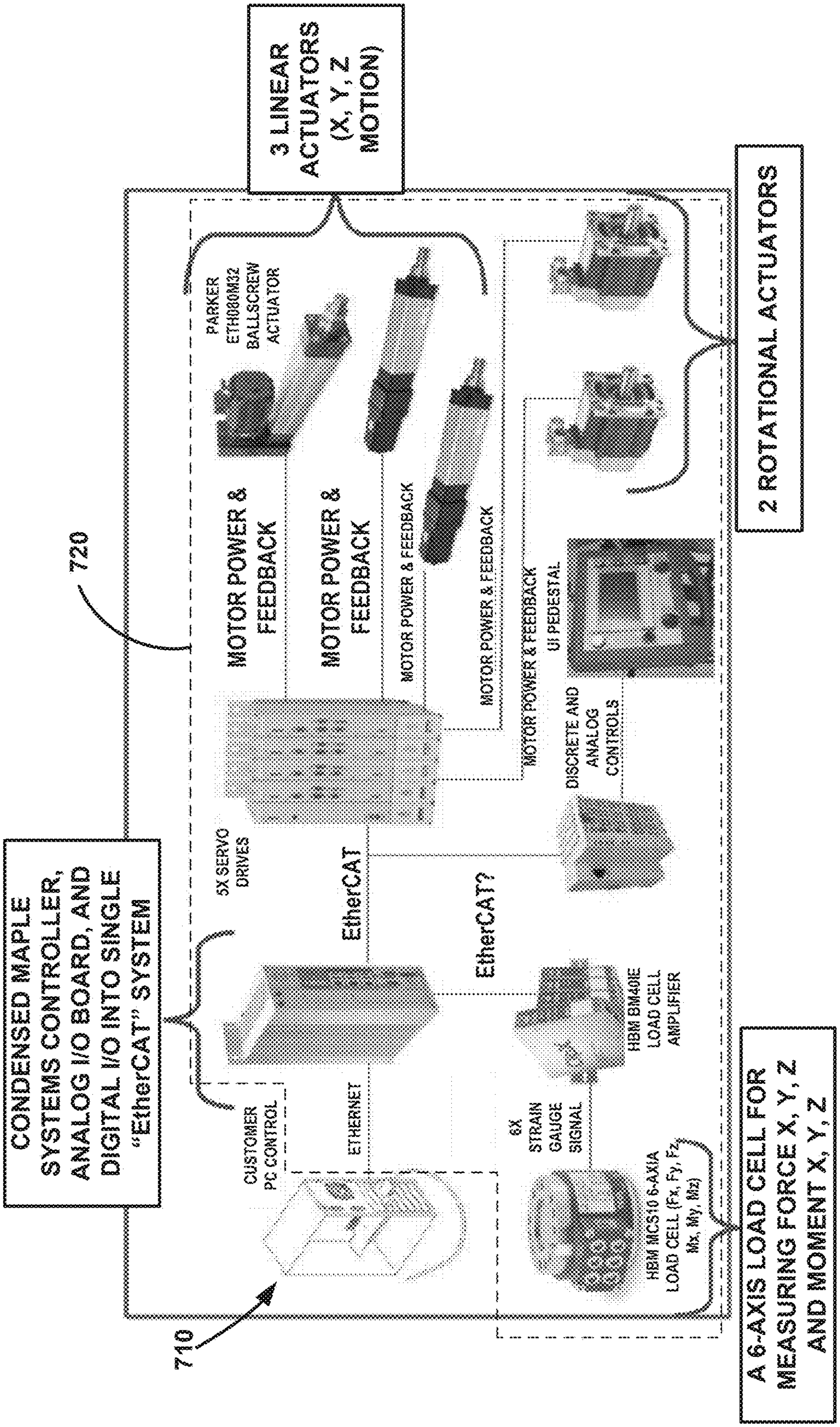
FIG. 17 is a conceptual diagram illustrating components of the example system of FIG. 16, in accordance with one or more techniques of this disclosure.

FIG. 17 is a conceptual diagram illustrating components of the example system of FIG. 16, in accordance with one or more techniques of this disclosure. For example, FIG. 17 includes Customer PC control 710, which may be an example of processing circuitry 660 of FIG. 6. Additionally, FIG. 17 includes components 720, which may be one or more components of medical device 608 and user interface 670. For example, components 720 may include electric motors (e.g., rotational actuators and linear actuators), user interface components (UI pedestal, discrete controls, and analog controls), sensors (load cell, load cell amplifier), and servers (e.g., servo drives). The linear actuators and rotational actuators shown in FIG. 17 may, in some examples, control rotation at one or more of joints 614, 624, 626, and 634.

Figure 18:
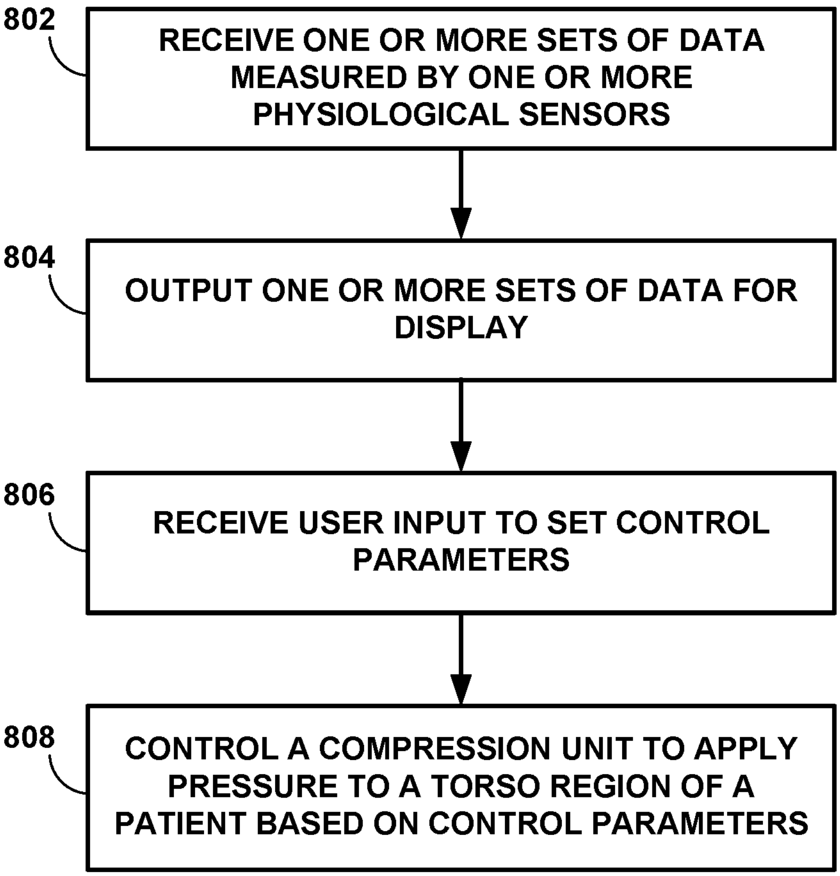
FIG. 18 is a flow diagram illustrating an example operation for controlling a medical device to administer CPR to a patient, in accordance with one or more techniques of this disclosure.

FIG. 18 is a flow diagram illustrating an example operation for controlling a medical device to administer CPR to a patient, in accordance with one or more techniques of this disclosure. For convenience, FIG. 18 is described with respect to medical device 608, sensor(s) 650, processing circuitry 660, and user interface 670 of FIG. 16. However, the techniques of FIG. 16 may be performed by different components of medical device 608, sensor(s) 650, processing circuitry 660, and user interface 670 or by additional or alternative devices (e.g., medical device 108, sensor(s) 150, and processing circuitry 160 of FIG. 1).

As illustrated in FIG. 18, processing circuitry 660 receives one or more sets of data measured by one or more physiological sensors (802). In some examples, the one or more physiological sensors are a part of sensor(s) 650. In some examples, the one or more sets of data include information indicative of CPP associated with a patient. For example, the one or more sets of data may include information of the CPP over a period of time. Additionally, or alternatively, the one or more sets of data may include information indicative of ECG, impedance, intrathoracic pressure, aortic pressure, end tidal CO2, tissue pH, tissue oxygen saturation, a concentration or a partial pressure $CO_2$ gas, or any combination thereof. Processing circuitry 660 outputs the one or more sets of data for display (804). For example, processing circuitry 660 may output information indicative of the one or more sets of data to user interface 670 such that a user may view and/or interact with the one or more sets of data via user interface 670.

Subsequently, user interface 670 receives user input to set control parameters (806). In some examples, processing circuitry 660 receives data indicative of a user selection of values for one or more control parameters of a set of control parameters. The user selection of the values for the set of control parameters, in some cases, is selected based on the one or more sets of data output to user interface 670. In some examples, the set of control parameters may include one or more of an oscillation frequency of compression unit 610, an oscillation amplitude of compression unit 610, a duty cycle of compression unit 610, a maximum applied pressure of compression unit 610, or one or more position parameters corresponding to the at least one degree of freedom. The one or more position parameters may include at least one of a linear velocity of compression unit 610, an angular velocity of compression unit 610, a linear acceleration of compression unit 610, and an angular acceleration of compression unit 610. Processing circuitry 660 may control compression unit 610 to apply a pressure to a torso region of the patient based on the set of control parameters (808). In this way, the example operation of FIG. 18 may enable processing circuitry 660 to control the administration of CPR to the patient based on user input, the user input being made based on an interpretation of the one or more sets of physiological data collected using sensor(s) 650.

The following examples may illustrate one or more aspects of the disclosure.

Example 1. A medical system comprising: a compression unit configured to apply pressure to a torso region of a patient, wherein the compression unit is configured to move according to at least one degree of freedom; and processing circuitry configured to: receive, from one or more physiological sensors configured to generate one or more sets of data representative of one or more patient parameters of a patient, the one or more sets of data; generate, using a deep learning model, an output data set representing a predicted trajectory of at least one patient parameter of the one or more patient parameters; determine, based on the output data set, a set of one or more control parameters; and control, based on the set of one or more control parameters, the compression unit to apply the pressure to the torso region of the patient.

Example 2. The medical system of example 1, wherein the at least one patient parameter comprises coronary perfusion pressure (CPP).

Example 3. The medical system of any of examples 1-2, wherein the one or more physiological sensors comprises at least one of piezoelectric pressure sensors, intraosseous pressure sensors, flow meter sensors, electrocardiogram (ECG) electrodes, fluoroscopic imaging sensors, ultrasound imaging transducers, impedance mapping sensors, infrared imaging sensors, intrathoracic pressure sensors, or capnography sensors.

Example 4. The medical system of any of examples 1-3, wherein the compression unit is configured to repeatedly move a piston along a longitudinal axis between a proximal end to a distal end, and wherein the compression unit is further configured to: apply the pressure by moving the piston towards the distal end along the longitudinal axis and towards the torso region of the patient, and remove at least a portion of the pressure by moving the piston towards the proximal end along the longitudinal axis and away from the torso region of the patient.

Example 5. The medical system of example 4, wherein the one or more degrees of freedom comprise: a first linear degree of freedom allowing the compression unit to move perpendicular to a two-dimensional plane representing the torso of the patient; a second linear degree of freedom and a third linear degree of freedom allowing the compression unit to move parallel to the two-dimensional plane; a first rotational degree of freedom allowing the compression unit to rotate about a first axis within the two-dimensional plane; and a second rotational degree of freedom allowing the compression unit to rotate about a second axis within the two-dimensional plane, the first axis being perpendicular to the second axis, wherein the compression unit is configured to alter a direction in which the piston applies the pressure and removes at least the portion of the pressure by moving the piston within the one or more degrees of freedom.

Example 6. The medical system of any of examples 1-5, wherein the processing circuitry is configured to determine the set of one or more control parameters in real time.

Example 7. The medical system of any combination of any of examples 1-6, wherein the set of one or more control parameters comprises at least one of: an oscillation frequency of the compression unit, an oscillation amplitude of the compression unit, a duty cycle of the compression unit, a maximum applied pressure of the compression unit, or one or more position parameters corresponding to the at least one degree of freedom, and wherein the one or more position parameters comprise at least one of a linear velocity of the compression unit, an angular velocity of the compression unit, a linear acceleration of the compression unit, or an angular acceleration of the compression unit.

Example 8. The medical system of any of examples 1-7, wherein the processing circuitry is configured to update, based on the one or more sets of data, one or more parameters of the deep learning model, wherein the one or more sets of data comprise real-time data sets and historical data sets.

Example 9. The medical system of example 8, wherein the processing circuitry is configured to train the deep learning model based on the historical data sets, and wherein the historical data sets represent data measured from a plurality of historical test patients.

Example 10. The medical system of any of example 8, wherein the processing circuitry is configured to update the one or more parameters of the deep learning model by: calculating, using the deep learning model, a set of predicted values based on the one or more sets of data, wherein the deep learning model comprises a plurality of parameters; calculating, based on the set of predicted values and the one or more sets of data, a set of error values, wherein the set of error values represents an error of the set of predicted values relative to the one or more sets of data; and updating, based on the set of error values, the one or more parameters of the deep learning model.

Example 11. The medical system of any of examples 1-10, wherein the processing circuitry is configured to determine the set of one or more control parameters by: creating a plurality of sets of control parameters based on the output data set; calculating, using a cost function, a cost value for each set of control parameters of the plurality of sets of control parameters; and identifying a lowest cost value set of the plurality of sets of control parameters as the set of one or more control parameters for controlling the compression unit.

Example 12. The medical system of any of examples 1-11, further comprising the one or more physiological sensors.

Example 13. A method comprising: receiving, by processing circuitry and from one or more physiological sensors configured to generate one or more sets of data representative of one or more patient parameters of a patient, the one or more sets of data; generating, by the processing circuitry and using a deep learning model, an output data set representing a predicted trajectory of at least one patient parameter of the one or more patient parameters; determining, by the processing circuitry and based on the output data set, a set of one or more control parameters; and controlling, by the processing circuitry and based on the set of one or more control parameters, a compression unit to apply pressure to a torso region of the patient, wherein the compression unit is configured to move according to at least one degree of freedom.

Example 14. The method of example 13, wherein the at least one patient parameter comprises coronary perfusion pressure (CPP).

Example 15. The method of any of examples 13-14, wherein the one or more physiological sensors comprises at least one of piezoelectric pressure sensors, intraosseous pressure sensors, flow meter sensors, electrocardiogram (ECG) electrodes, fluoroscopic imaging sensors, ultrasound imaging transducers, impedance mapping sensors, infrared imaging sensors, intrathoracic pressure sensors, or capnography sensors.

Example 16. The method of any of examples 13-15, wherein controlling the compression unit comprises controlling the compression unit to repeatedly move a piston along a longitudinal axis between a proximal end to a distal end, and wherein the method further comprises: applying the pressure by moving the piston towards the distal end along the longitudinal axis and towards the torso region of the patient, and removing at least a portion of the pressure by moving the piston towards the proximal end along the longitudinal axis and away from the torso region of the patient.

Example 17. The method of any of example 16, wherein the one or more degrees of freedom comprise: a first horizontal degree of freedom allowing the compression unit to move perpendicular to a two-dimensional plane representing the torso of the patient; a second horizontal degree of freedom and a third horizontal degree of freedom allowing the compression unit to move parallel to the two-dimensional plane; a first rotational degree of freedom allowing the compression unit to rotate about a first axis within the two-dimensional plane; and a second rotational degree of freedom allowing the compression unit to rotate about a second axis within the two-dimensional plane, the first axis being perpendicular to the second axis, wherein the compression unit is configured to alter a direction in which the piston applies the pressure and removes at least the portion of the pressure by moving the piston within the one or more degrees of freedom.

Example 18. The method of any of examples 13-17, wherein the processing circuitry is configured to determine the set of one or more control parameters in real time.

Example 19. The method of any of examples 13-18, wherein the set of one or more control parameters comprises at least one of: an oscillation frequency of the compression unit, an oscillation amplitude of the compression unit, a duty cycle of the compression unit, a maximum applied pressure of the compression unit, or one or more position parameters corresponding to the at least one degree of freedom, and wherein the one or more position parameters comprise at least one of a linear velocity of the compression unit, an angular velocity of the compression unit, a linear acceleration of the compression unit, and an angular acceleration of the compression unit.

Example 20. The method of any of examples 13-19, further comprising updating, based on the one or more sets of data, one or more parameters of the deep learning model, wherein the one or more sets of data comprise real-time data sets and historical data sets.

Example 21. The method of example 20, further comprising training the deep learning model based on the historical data sets, and wherein the historical data sets represent data measured from a plurality of historical test patients.

Example 22. The method of any of example 20, wherein updating the one or more parameters of the deep learning model comprises: calculating, using the deep learning model, a set of predicted values based on the one or more sets of data, wherein the deep learning model comprises a plurality of parameters; calculating, based on the set of predicted values and the one or more sets of data, a set of error values, wherein the set of error values represent an error of the set of predicted values relative to the one or more sets of data; and updating, based on the set of error values, the one or more parameters of the deep learning model.

Example 23. The method of any of examples 13-22, wherein determining the set of one or more control parameters comprises: creating a plurality of sets of control parameters based on the output data set; calculating, using a cost function, a cost value for each set of control parameters of the plurality of sets of control parameters; and identifying a lowest cost value set of the plurality of sets of control parameters as the set of one or more control parameters for controlling the compression unit.

Example 24. The method of any of examples 13-23, further comprising: generating, by the one or more physiological sensors, the one or more sets of data representative of the one or more patient parameters of the patient; and adding the one or more sets of data to historical data sets.

Example 25. A system comprising: a memory comprising a deep learning model; and processing circuitry configured to: receive, from one or more physiological sensors configured to generate one or more sets of data representative of one or more patient parameters of a patient, one or more sets of data; generate, using the deep learning model, an output data set representing a predicted trajectory of at least one patient parameter of the one or more patient parameters; determine, based on the output data set, a set of one or more control parameters; and control, based on the set of one or more control parameters, a compression unit to apply pressure to a torso region of the patient, wherein the compression unit is configured to move according to at least one degree of freedom.

Example 26. The system of example 25, wherein the at least one patient parameter comprises coronary perfusion pressure (CPP).

Example 27. The system of any of examples 25-26, wherein the processing circuitry is configured to update, based on the one or more sets of data, one or more parameters of the deep learning model.

Example 28. The system of example 27, wherein the processing circuitry is configured to train the deep learning model based on a set of baseline data, and wherein the set of baseline data represents data measured from a plurality of test patients different from the patient.

Example 29. The system of example 27, wherein the processing circuitry is configured to update the one or more parameters of the deep learning model by: calculating, using the deep learning model, a set of predicted values based on the one or more sets of data, wherein the deep learning model comprises a plurality of parameters; calculating, based on the set of predicted values and the one or more sets of data, a set of error values, wherein the set of error values represents an error of the set of predicted values relative to the one or more sets of data; and updating, based on the set of error values, the one or more parameters of the deep learning model.

Example 30. A method comprising: receiving a set of baseline data, wherein the set of baseline data represents data measured from a plurality of historical test patients; training a plurality of parameters that at least partially define a deep learning model; receiving one or more sets of data representative of one or more patient parameters of a patient, wherein the one or more sets of data are generated by one or more physiological sensors associated with the patient; updating, based on the one or more sets of data, one or more parameters of the plurality of parameters that at least partially defines the deep learning model; determining, using the deep learning model and based on the one or more sets of data, a plurality of output data sets, wherein the plurality of output data sets represent predicted trajectories of at least one patient parameter of the plurality of patient parameters; determining, based on the plurality of output data sets, a set of one or more control parameters that at least partially defines operation of a compression unit configured to apply pressure to a torso region of the patient by moving according to at least one degree of freedom; and outputting the set of one or more control parameters.

Example 31. The method of example 30, wherein determining the set of one or more control parameters comprises: creating a plurality of sets of control parameters based on the plurality of output data sets; calculating, using a cost function, a cost value for each set of control parameters of the plurality of sets of control parameters; and identifying a lowest cost value set of the plurality of sets of control parameters as the set of one or more control parameters for controlling the compression unit.

Example 32. The method of any of examples 30-31, wherein training the plurality of parameters of the deep learning model comprises calculating a plurality of weight values for a plurality of nodes of the deep learning model.

Example 33. The method of any of examples 30-32, wherein determining the set of one or more control parameters comprises determining the set of one or more control parameters in real time in response to receiving the one or more sets of data.

Example 34. A medical system comprising: a compression unit configured to apply pressure to a torso region of a patient, wherein the compression unit is configured to move according to at least one degree of freedom; and processing circuitry configured to: receive, from one or more physiological sensors configured to generate one or more sets of data representative of one or more patient parameters of a patient, the one or more sets of data; output the one or more sets of data for display on a user interface; receive, from the user interface, information indicative of a set of one or more control parameters; and control, based on the set of one or more control parameters, the compression unit to apply the pressure to the torso region of the patient.

Example 35. The method example 34, wherein the at least one patient parameter comprises coronary perfusion pressure (CPP).

Example 36. The method of any of examples 34-35, wherein the one or more physiological sensors comprises at least one of piezoelectric pressure sensors, intraosseous pressure sensors, flow meter sensors, electrocardiogram (ECG) electrodes, fluoroscopic imaging sensors, ultrasound imaging transducers, impedance mapping sensors, infrared imaging sensors, intrathoracic pressure sensors, or capnography sensors.

The techniques described in this disclosure may be implemented, at least in part, in hardware, software, firmware or any combination thereof. For example, various aspects of the described techniques may be implemented within one or more processors or processing circuitry, including one or more microprocessors, DSPs, ASICs, FPGAS, GPUs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, circuits or components may be implemented together or separately as discrete but interoperable logic devices. Depiction of different features as circuits or units is intended to highlight different functional aspects and does not necessarily imply that such circuits or units must be realized by separate hardware or software components. Rather, functionality associated with one or more circuits or units may be performed by separate hardware or software components or integrated within common or separate hardware or software components.

The techniques described in this disclosure may also be embodied or encoded in a computer-readable medium, such as a computer-readable storage medium, containing instructions that may be described as non-transitory media. Instructions embedded or encoded in a computer-readable storage medium may cause a programmable processor, or other processor, to perform the method, e.g. when the instructions are executed. Computer readable storage media may include cloud storage mediums, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various aspects of the disclosure have been described. These and other examples are within the scope of the following claims.

What is claimed is:

1. A medical system comprising:

a compression mechanism configured to apply pressure to a torso region of a patient, wherein the compression mechanism is configured to move according to at least one degree of freedom; and processing circuitry configured to:

receive, from a plurality of physiological sensors, one or more sets of data representative of a plurality of patient parameters over a period of time, wherein the plurality of patient parameters comprises a right atrium pressure and an aortic blood pressure;

generate, using a deep learning model, output data sets over the period of time of predicted future trajectories of at least one patient parameter of the plurality of patient parameters, each predicted future trajectory of the predicted future trajectories representative of a predicted future state of the patient;

iteratively determine, based on at least one output data set of the predicted future trajectories, different sets of values for a plurality of control parameters, wherein the plurality of control parameters comprises an oscillation frequency, a duty cycle of compression, and compression depth; and control, using the different sets of values for the plurality of control parameters over the period of time, the compression mechanism to apply the pressure to the torso region of the patient.

2. The medical system of claim 1, wherein the at least one patient parameter comprises coronary perfusion pressure (CPP).

3. The medical system of claim 1, wherein the plurality of physiological sensors comprises at least one of piezoelectric pressure sensors, intraosseous pressure sensors, flow meter sensors, electrocardiogram (ECG) electrodes, fluoroscopic imaging sensors, ultrasound imaging transducers, impedance mapping sensors, infrared imaging sensors, intrathoracic pressure sensors, or capnography sensors.

4. The medical system of claim 1, wherein the compression mechanism is configured to repeatedly move a piston along a longitudinal axis between a proximal end to a distal end according to a value of the duty cycle, and wherein the compression mechanism is further configured to:

apply the pressure by moving the piston towards the distal end along the longitudinal axis and towards the torso region of the patient, and remove at least a portion of the pressure by moving the piston towards the proximal end along the longitudinal axis and away from the torso region of the patient.

5. The medical system of claim 4, wherein the one or more degrees of freedom comprise:

a first linear degree of freedom allowing the compression mechanism to move perpendicular to a two-dimensional plane representing the torso of the patient;

a second linear degree of freedom and a third linear degree of freedom allowing the compression mechanism to move parallel to the two-dimensional plane;

a first rotational degree of freedom allowing the compression mechanism to rotate about a first axis within the two-dimensional plane; and a second rotational degree of freedom allowing the compression mechanism to rotate about a second axis within the two-dimensional plane, the first axis being perpendicular to the second axis, wherein the compression mechanism is configured to alter a direction in which the piston applies the pressure and removes at least the portion of the pressure by moving the piston within the one or more degrees of freedom.

6. The medical system of claim 1, wherein the processing circuitry is configured to determine the different sets of values for the plurality of control parameters in real time.

7. The medical system of claim 1, wherein the plurality of control parameters comprises at least one of: a maximum applied pressure of the compression mechanism, or one or more position parameters corresponding to the at least one degree of freedom, and wherein the one or more position parameters comprise at least one of a linear velocity of the compression mechanism, an angular velocity of the compression mechanism, a linear acceleration of the compression mechanism, or an angular acceleration of the compression mechanism.

8. The medical system of claim 1, wherein the processing circuitry is configured to update, based on the one or more sets of data, one or more model parameters of the deep learning model, wherein the one or more sets of data comprise real-time data sets and historical data sets.

9. The medical system of claim 8, wherein the processing circuitry is configured to train the deep learning model based on the historical data sets, and wherein the historical data sets represent data measured from a plurality of historical test patients.

10. The medical system of claim 8, wherein the processing circuitry is configured to update the one or more model parameters of the deep learning model by:

calculating, using the deep learning model, a set of predicted values based on the one or more sets of data, wherein the deep learning model comprises a plurality of model parameters comprising the one or more model parameters;

calculating, based on the set of predicted values and the one or more sets of data, a set of error values, wherein the set of error values represents an error of the set of predicted values relative to the one or more sets of data; and updating, based on the set of error values, the one or more model parameters of the deep learning model.

11. The medical system of claim 1, wherein the processing circuitry is configured to determine each set of values of the different sets of values for the plurality of control parameters by:

creating a plurality of sets of possible control parameter values based on the at least one output data set;

calculating, using a cost function, a cost value for each set of possible control parameter values of the plurality of sets of possible control parameter values; and identifying a lowest cost value set of the plurality of sets of possible control parameter values for controlling the compression mechanism.

12. The medical system of claim 1, further comprising the plurality of physiological sensors.

13. A method comprising:

receiving, by processing circuitry and from a plurality of physiological sensors, one or more sets of data representative of a plurality of patient parameters over a period of time, wherein the plurality of patient parameters comprises a right atrium pressure and an aortic blood pressure;

generating, by the processing circuitry and using a deep learning model, output data sets over the period of time of predicted future trajectories of at least one patient parameter of the plurality of patient parameters, each predicted future trajectory of the predicted future trajectories representative of a predicted future state of the patient;

iteratively determining, by the processing circuitry and based on at least one output data set of the predicted future trajectories, different sets of values for a plurality of control parameters, wherein the plurality of control parameters comprises an oscillation frequency, a duty cycle of compression, and compression depth; and controlling, by the processing circuitry and using the different sets of values for the plurality of control parameters over the period of time, a compression mechanism to apply pressure to a torso region of the patient, wherein the compression mechanism is configured to move according to at least one degree of freedom.

14. The method of claim 13, wherein the at least one patient parameter comprises coronary perfusion pressure (CPP).

15. The method of claim 13, wherein the plurality of physiological sensors comprises at least one of piezoelectric pressure sensors, intraosseous pressure sensors, flow meter sensors, electrocardiogram (ECG) electrodes, fluoroscopic imaging sensors, ultrasound imaging transducers, impedance mapping sensors, infrared imaging sensors, intrathoracic pressure sensors, or capnography sensors.

16. The method of claim 13, wherein controlling the compression mechanism comprises controlling the compression mechanism to repeatedly move a piston along a longitudinal axis between a proximal end to a distal end according to a value of the duty cycle, and wherein the method further comprises: applying the pressure by moving the piston towards the distal end along the longitudinal axis and towards the torso region of the patient, and removing at least a portion of the pressure by moving the piston towards the proximal end along the longitudinal axis and away from the torso region of the patient.

17. The method of claim 13, wherein the one or more degrees of freedom comprise:

a first horizontal degree of freedom allowing the compression mechanism to move perpendicular to a two-dimensional plane representing the torso of the patient;

a second horizontal degree of freedom and a third horizontal degree of freedom allowing the compression mechanism to move parallel to the two-dimensional plane;

a first rotational degree of freedom allowing the compression mechanism to rotate about a first axis within the two-dimensional plane; and a second rotational degree of freedom allowing the compression mechanism to rotate about a second axis within the two-dimensional plane, the first axis being perpendicular to the second axis, wherein the compression mechanism is configured to alter a direction in which the piston applies the pressure and removes at least the portion of the pressure by moving the piston within the one or more degrees of freedom.

18. The method of claim 13, wherein the set of one or more control parameters comprises at least one of:

a maximum applied pressure of the compression mechanism, or one or more position parameters corresponding to the at least one degree of freedom, and wherein the one or more position parameters comprise at least one of a linear velocity of the compression mechanism, an angular velocity of the compression mechanism, a linear acceleration of the compression mechanism, and an angular acceleration of the compression mechanism.

19. The method of claim 13, further comprising updating, based on the one or more sets of data, one or more model parameters of the deep learning model, wherein the one or more sets of data comprise real-time data sets and historical data sets.

20. A system comprising:

a memory comprising a deep learning model; and processing circuitry configured to:

receive, from a plurality of physiological sensors, one or more sets of data representative of a plurality of patient parameters over a period of time, wherein the plurality of patient parameters comprises a right atrium pressure and an aortic blood pressure;

generate, using the deep learning model, output data sets over the period of time of predicted future trajectories of at least one patient parameter of the plurality of patient parameters, each predicted future trajectory of the predicted future trajectories representative of a predicted future state of the patient;

iteratively determine, based on at least one output data set of the predicted future trajectories, different sets of values for a plurality of control parameters, wherein the plurality of control parameters comprises an oscillation frequency, a duty cycle of compression, and compression depth; and control, using the different sets of values for the plurality of control parameters over the period of time, the compression mechanism to apply the pressure to the torso region of the patient.

* * * * *